United States Patent
Laird et al.

(10) Patent No.: US 10,611,426 B2
(45) Date of Patent: Apr. 7, 2020

(54) METHODS AND APPARATUS FOR RELEASABLY SUPPORTING A VEHICLE WHEEL ASSEMBLY

(71) Applicant: Fox Factory, Inc., Scotts Valley, CA (US)

(72) Inventors: Andrew Laird, Los Gatos, CA (US); Mario Galasso, Sandy Hook, CT (US); William M. Becker, Aptos, CA (US); David M. Haugen, Pacific Grove, CA (US)

(73) Assignee: Fox Factory, Inc., Braselton, GA (US)

( * ) Notice: Subject to any disclaimer, the term of this patent is extended or adjusted under 35 U.S.C. 154(b) by 236 days.

(21) Appl. No.: 15/588,169

(22) Filed: May 5, 2017

(65) Prior Publication Data

US 2017/0239985 A1    Aug. 24, 2017

Related U.S. Application Data

(63) Continuation of application No. 14/605,463, filed on Jan. 26, 2015, now Pat. No. 9,796,446, which is a
(Continued)

(51) Int. Cl.
*B62K 25/02*    (2006.01)
*B60B 27/02*    (2006.01)

(52) U.S. Cl.
CPC ............ *B62K 25/02* (2013.01); *B60B 27/026* (2013.01); *B62K 2206/00* (2013.01);
(Continued)

(58) Field of Classification Search
CPC ........ B62K 25/02; B62K 25/04; B62K 25/06; B62K 25/08; B60B 27/023; B60B 27/026
See application file for complete search history.

(56) References Cited

U.S. PATENT DOCUMENTS

| | | | |
|---|---|---|---|
| 4,400,038 | A | 8/1983 | Hosokawa et al. |
| 4,763,957 | A | 8/1988 | Poehlmann et al. |

(Continued)

FOREIGN PATENT DOCUMENTS

| | | |
|---|---|---|
| DE | 202007006451 U1 | 11/2007 |
| EP | 0658472 A1 | 6/1995 |

(Continued)

OTHER PUBLICATIONS

"European Search Report and Written Opinion, European Patent Application No. 14161845.4", dated Sep. 11, 2014, 6 Pages.
(Continued)

*Primary Examiner* — Jason R Bellinger

(57) ABSTRACT

An axle assembly for a vehicle includes an axle shaft having a bolt end and a lever end. The axle assembly includes a cam assembly coupled to the lever end of the axle shaft. The cam assembly includes a cam housing, a cam follower shaft coupled to the cam housing, and the cam follower shaft is located within the axle shaft. The cam follower shaft does not extend the full length of the axle shaft. The cam shaft is coupled to the cam follower shaft, and a lever is coupled to the cam assembly. The lever is rotatable from an open position to a closed position, and an angle of maximum rotation for the lever between the open position and the closed position is less than 180 degrees.

37 Claims, 21 Drawing Sheets

Related U.S. Application Data continuation of application No. 13/527,968, filed on Jun. 20, 2012, now Pat. No. 8,974,009, which is a continuation of application No. 12/470,432, filed on May 21, 2009, now Pat. No. 8,226,172.

(60) Provisional application No. 61/054,852, filed on May 21, 2008.

(52) U.S. Cl.
CPC .... *Y10T 29/49622* (2015.01); *Y10T 29/49948* (2015.01); *Y10T 29/49963* (2015.01)

(56) References Cited

U.S. PATENT DOCUMENTS

| | | | |
|---|---|---|---|
| 5,630,652 A | 5/1997 | Cech | |
| 5,865,560 A | 2/1999 | Mercat et al. | |
| 6,089,675 A | 7/2000 | Schlanger | |
| 6,202,458 B1 | 3/2001 | Buchalter | |
| 6,386,643 B1 | 5/2002 | Marzocchi et al. | |
| 6,454,363 B1 | 9/2002 | Vignocchi et al. | |
| 7,090,308 B2 | 8/2006 | Rose et al. | |
| 7,654,546 B2 | 2/2010 | Watarai | |
| 7,654,548 B2 | 2/2010 | Kanehisa et al. | |
| 7,669,871 B2 | 3/2010 | Watarai | |
| 8,226,172 B2 | 7/2012 | Laird et al. | |
| 8,974,009 B2 | 3/2015 | Haugen et al. | |
| 9,796,446 B2 | 10/2017 | Laird et al. | |
| 2004/0046353 A1* | 3/2004 | Neugent | B62K 25/02 280/274 |
| 2005/0110335 A1 | 5/2005 | Rose et al. | |
| 2007/0209468 A1* | 9/2007 | Yu | B62K 25/02 74/519 |
| 2008/0185908 A1* | 8/2008 | Hara | B60B 27/026 301/124.2 |
| 2012/0049613 A1* | 3/2012 | Inoue | B62K 23/06 301/124.2 |
| 2015/0069827 A1* | 3/2015 | Nakajima | B62K 25/02 301/124.2 |

FOREIGN PATENT DOCUMENTS

| | | |
|---|---|---|
| FR | 2776612 A1 | 10/1999 |
| GB | 17279 | 6/1912 |
| WO | 8900510 A1 | 1/1989 |
| WO | 2005051753 A1 | 6/2005 |

OTHER PUBLICATIONS

"European Search Report and Written Opinion, European Patent Application No. 18211377.9", dated Jun. 17, 2019, 9 Pages.
"Extended European Search Report for European Application No. 09160887 , 6 pages, dated Jan. 24, 2013 (dated Jan. 24, 2013))".
"Office Action for European Application No. 14161845.4, 8 pages, dated Mar. 8, 2017".
Defendant SRAM, LLC's and Sandleford Limited's Final Invalidity Contentions, *Fox Factory Inc.*, v *SRAM, LLC*, Civil Action No. 1:18-cv-00127-NYW, filed on Apr. 5, 2018, 22 pages.
009 Final Invalidity Contentions "SRAM's Maxle 360 / Rear Maxle in view of U.S. Pat. No. 5,622,412 to Yamane", Appendix P, Apr. 5, 2018, 16 Pages.
009 Final Invalidity Contentions "U.S. Pat. No. 7,562,943 to Kanehisa in view of U.S. Pat. No. 5,622,412 to Yamane and the Totem Fork", Appendix R, Apr. 5, 2018, 18 Pages.
009 Final Invalidity Contentions "U.S. Pat. No. 7,628,416 to Hara in view of U.S. Pat. No. 5,622,412 to Yamane and the Totem Fork", Appendix Q, Apr. 5, 2018, 18 Pages.
172 Final Invalidity Contentions "SRAM's Maxle 360 / Rear Maxle in view of U.S. Pat. No. 5,622,412 to Yamane", Appendix M, Apr. 5, 2018, 16 Pages.
172 Final Invalidity Contentions "U.S. Pat. No. 7,562,943 to Kanehisa in view of U.S. Pat. No. 5,622,412 to Yamane and the Totem Fork", Appendix O, Apr. 5, 2018, 18 Pages.
172 Final Invalidity Contentions "U.S. Pat. No. 7,628,416 to Hara in view of U.S. Pat. No. 5,622,412 to Yamane and the Totem Fork", Appendix N, Apr. 5, 2018, 19 Pages.
Defendant SRAM LLC's Preliminary Invalidity Contentions Under Patent Local Rule 3-3, *Fox Factory Inc.*, v *SRAM, LLC*, Case No. 3:16-CV-03716-WHO, filed on Dec. 12, 2016 (18 pages).
User Specification, MY11 Argyle RCT, Drawing No. 98/4015-009-000, Version A.3, SRAM [SRAM-F 01150], 1 Page.
User Specification, MY11 DDC, Drawing No. 98/4015-012-000, Version C.3, SRAM [SRAM-F 01172], 2 Pages.
Argyle 2011 Technical Manual, Rock Shox, SRAM LLC, [SRAM-F 01122], 2010, 28 Pages.
Maxle, 95/4318-003-000 Rev B, SRAM LLC, [SRAM-F 00889], 2014, 2 Pages.
2011-Present Domain Dual Crown Service Manual, GEN. 0000000003209 Rev B, SRAM LLC, [SRAM-F 01151], 2014, 21 Pages.
Single Crown Front Suspension, 954018-012-000 Rev A, Rock Shox, SRAM LLC, [SRAM-F 00889], 2015, 15 Pages.
RS-1 Front Suspension User Manual, 95/4018-011-000 Rev A, Rock Shox, SRAM LLC, [SRAM-F 01024], 2015, 17 Pages.
Maxle, 95/4318-007-000 Rev A, SRAM LLC, [SRAM-F 00891], 2015, 7 Pages.
2017 Oil, Air and Coil Spring Specification, Front Suspension, GEN.00000000005176 Rev C, Rock Shox, SRAM LLC, [SRAM-F 00913], 2016, 10 Pages.
Bluto & Reba 2017 Service Manual, GEN. 0000000005114 Rev B, Rock Shox, SRAM LLC, [SRAM-F 01174], 2016, 32 Pages.
SID, Revelation, & Bluto RCT3 Service Manual, GEN. 0000000004976 Rev C, Rock Shox, SRAM LLC, [SRAM-F 01086], 2016, 36 Pages.
2014-2017 Pike Service Manual, GEN.0000000004461 Rev E. Rock Shox, SRAM LLC, [SRAM-F 00979], 2016, 45 Pages.
2017 SID Service Manual, GEN.0000000005125 Rev A, Rock Shox, SRAM LLC, [SRAM-F 01041], 2016, 45 Pages.
2016-2017 Lyrik Service Manual, GEN.0000000005042 Rev D, Rock Shox, SRAM LLC, [SRAM-F 00931], 2016, 48 Pages.
2016-2017, 30, Recon, and Sektor, Gold and Silver Service Manual, GEN.0000000004923 Rev C, Rock Shox, SRAM LLC, [SRAM-F 01206], 2016, 58 Pages.
2016 Oil, Air and Coil Spring Specifications, Front Suspension, GEN.0000000004984 Rev D, Rock Shox, SRAM LLC, [SRAM-F 00923], 2016, 8 Pages.
RockShox User Specification, MY07 Totem, Drawing No. US-4012-882-000, Rev C, SRAM Corporation, [SRAM-F 01762], Dec. 23, 2005, 1 Page.
SRAM Beyond Perfomance, OEM Products, Two Thousand Seven, SRAM Corporation, [SRAM-F 01458], Feb. 15, 2006, 302 Pages.
RockShox User Specification, MY07, Argyle, Drawing No. US-4012-880-000, Rev A, SRAM Corporation, [SRAM-F 01760], Feb. 21, 2006, 1 Page.
RockShox User Specification, MY07 Domn, Drawing No. US-4012-209-000, Rev B, SRAM Corporation, [SRAM-F 01763], Jan. 10, 2006, 1 Page.
RockShox User Specification, MY07 Lyrk, Drawing No. US-4012-208-000, Rev A, SRAM Corporation, [SRAM-F 01761], Jan. 10, 2006, 1 Page.
SRAM Beyond Performance, OEM Products, Two Thousand Six, SRAM Corporation, [SRAM-F 01264], Jan. 12, 2005, 194 Pages.
Pike, Reba, Revelation, Domain, Argyle User Manual, Powered by SRAM, 95/4015-000-000, Rev. A, SRAM corporation, [SRAM-F 01764], May 2006, 63 Pages.
Screen Shot of Web Page, URL: https://web.archive.org/web/20061109093259/http://www.sram.com/en/service/rockshox/view.php?catID=58,subcatID=2, [SRAM-F 01827], Nov 9, 2006, 1 page.
2017 Spare Parts Catalog, Rock Shox, SRAM LLC, [SRAM-F 00718], Nov. 2016, 171 Pages.
009 Initial Invalidity Contentions "SRAM's Maxle 360 (as depicted in https://www.youtube.com/watch?v=02HeyLFO9sM)", Appendix G, Dec. 12, 2016, 12 pages.

(56) References Cited

OTHER PUBLICATIONS

009 Initial Invalidity Contentions "SRAM's Maxle 360 (as depicted in https://www.youtube.com/watch?v=QKgC8kUia0s)", Appendix H, Dec. 12, 2016, 12.

009 Initial Invalidity Contentions "SRAM's Maxle 360 / Rear Maxle in view of U.S. Pat. No. 4,763,9577", Appendix K, Dec. 12, 2016, 13 pages.

009 Initial Invalidity Contentions "SRAM's Maxle 3601 Rear Maxle in view of U.S. Pat. No. 5,865,560", Appendix L, Dec. 12, 2016, 15 pages.

009 Initial Invalidity Contentions "SRAM's Maxle 3601 Rear Maxle", Appendix E, Dec. 12, 2016, 11 pages.

009 Initial Invalidity Contentions "SRAM's Maxle 360 / Rear Maxle", Appendix F, Dec. 12, 2016, 11 pages.

172 Initial Invalidity Contentions "SRAM's Maxle 360 (as depicted in https://www.youtube.com/watch?v=QKgC8kUia0s)", Appendix D, Dec. 12, 2016, 12 pages.

172 Initial Invalidity Contentions "SRAM's Maxie 360 / Rear Maxie in view of U.S. Pat. No. 4,763,957", Appendix I, Dec. 12, 2016, 13 pages.

172 Initial Invalidity Contentions "SRAM's Maxie 3601 Rear Maxie in view of U.S. Pat. No. 5,865,560", Appendix J, Dec. 12, 2016, 15 pages.

172 Initial Invalidity Contentions "SRAM's Maxie 360 (as depicted in https://www.youtube.com/watch?v=02HeyLFO9sM)", Appendix C, Dec. 12, 2016, 12 pages.

172 Initial Invalidity Contentions "SRAM's Maxie 360/ Rear Maxie (as depicted in SRAM's MY2007 User Specifications and MY2007 OEM Product Catalog)", Appendix B, Dec. 12, 2016, 10 pages.

172 Initial Invalidity Contentions "SRAM's Maxie 360/ Rear Maxle", Appendix A, Dec. 12, 2016, 11 pages.

"Maxie 360", Posting Date: Jan. 18, 2008, Site Name: YouTube.com URL: https://www.youtube.com/watch?v=QKgC8kUia0s (Transcription of video attached), [SRAM-F 01881], 1 page.

"Maxle.360", Posting Date: Aug. 24, 2007, Site Name: YouTube.com URL: https://www.youtube.com/watch?v=02HeyLF09sM (Transcription of video attached), [SRAM-F 01880], 1 page.

* cited by examiner

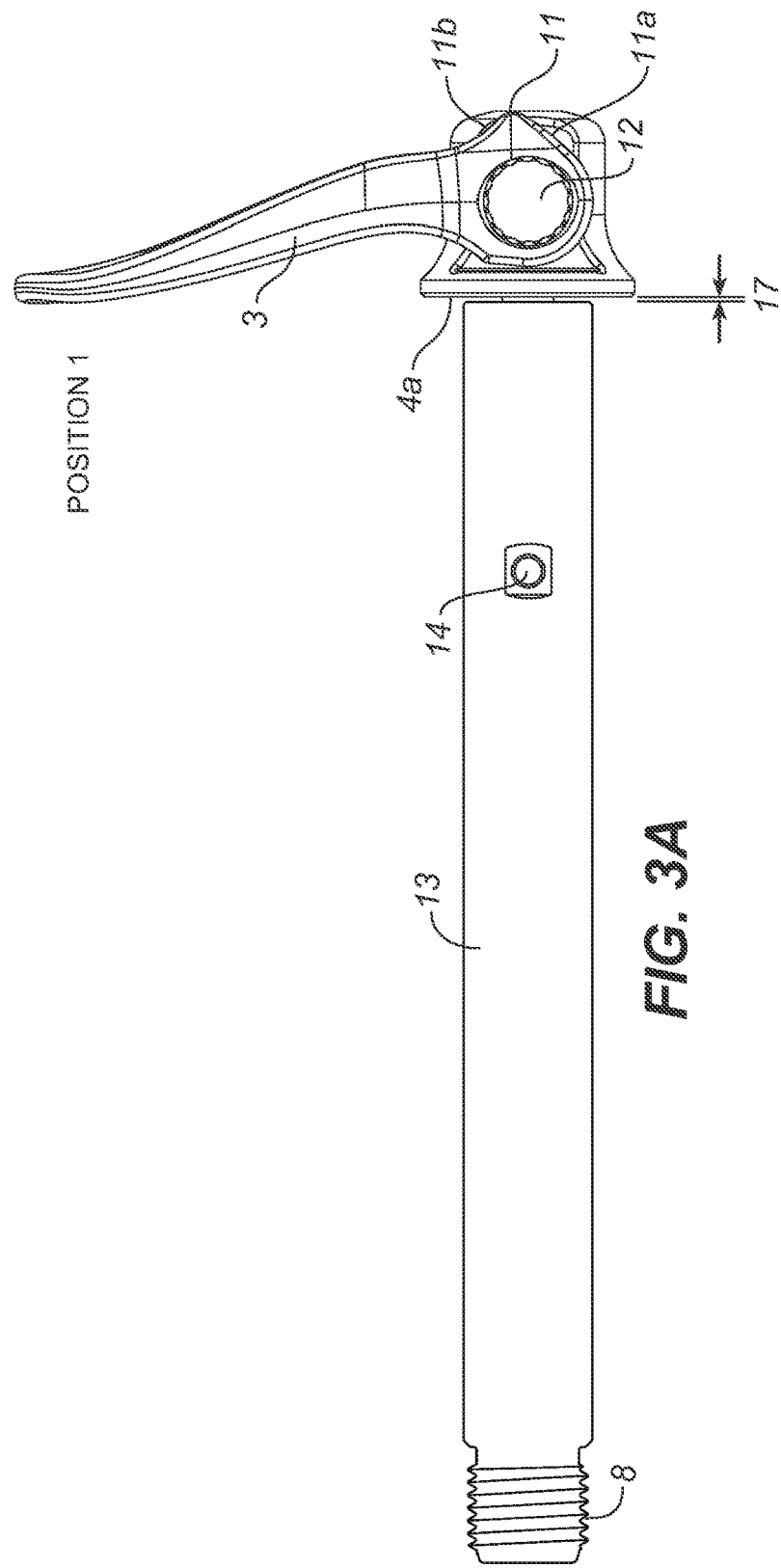

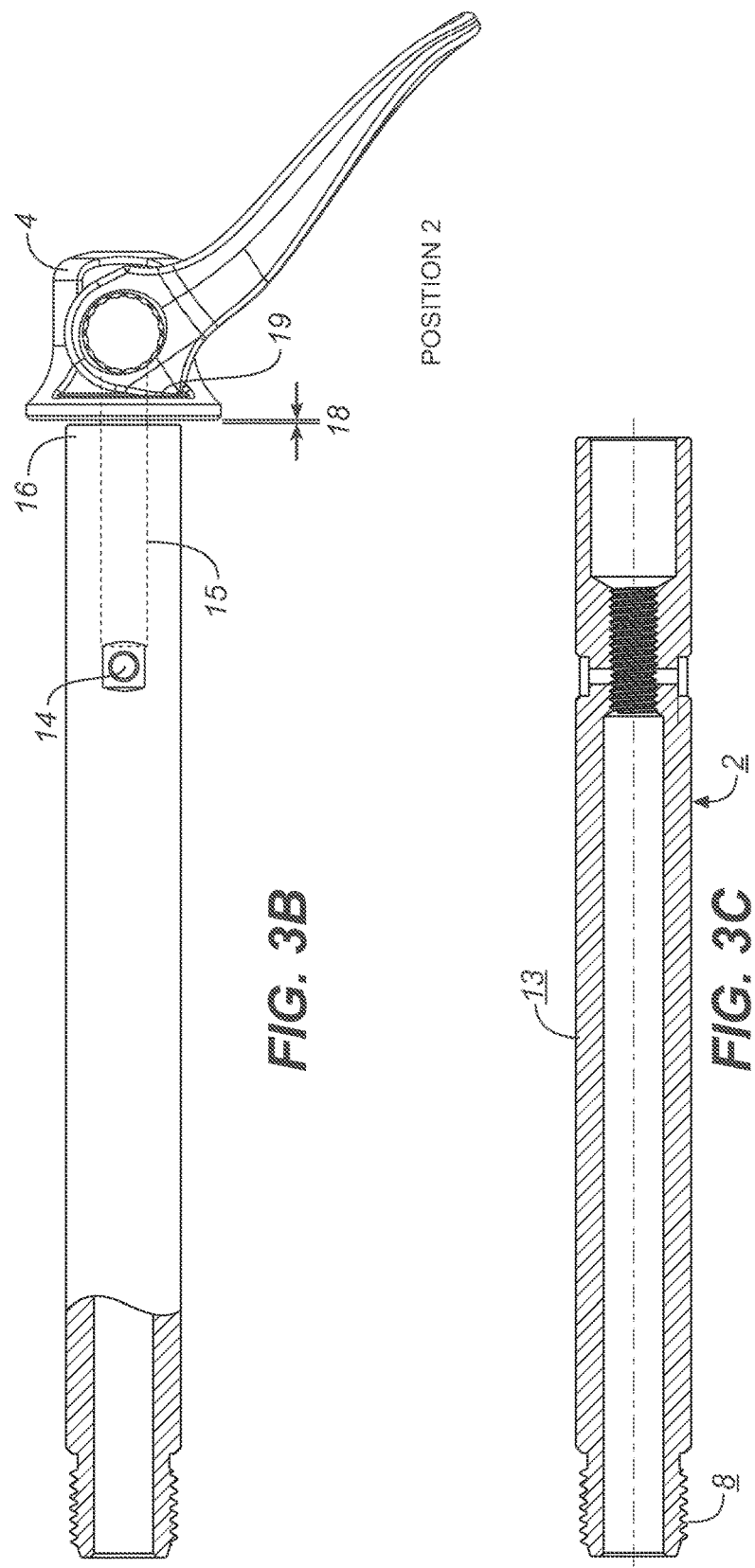

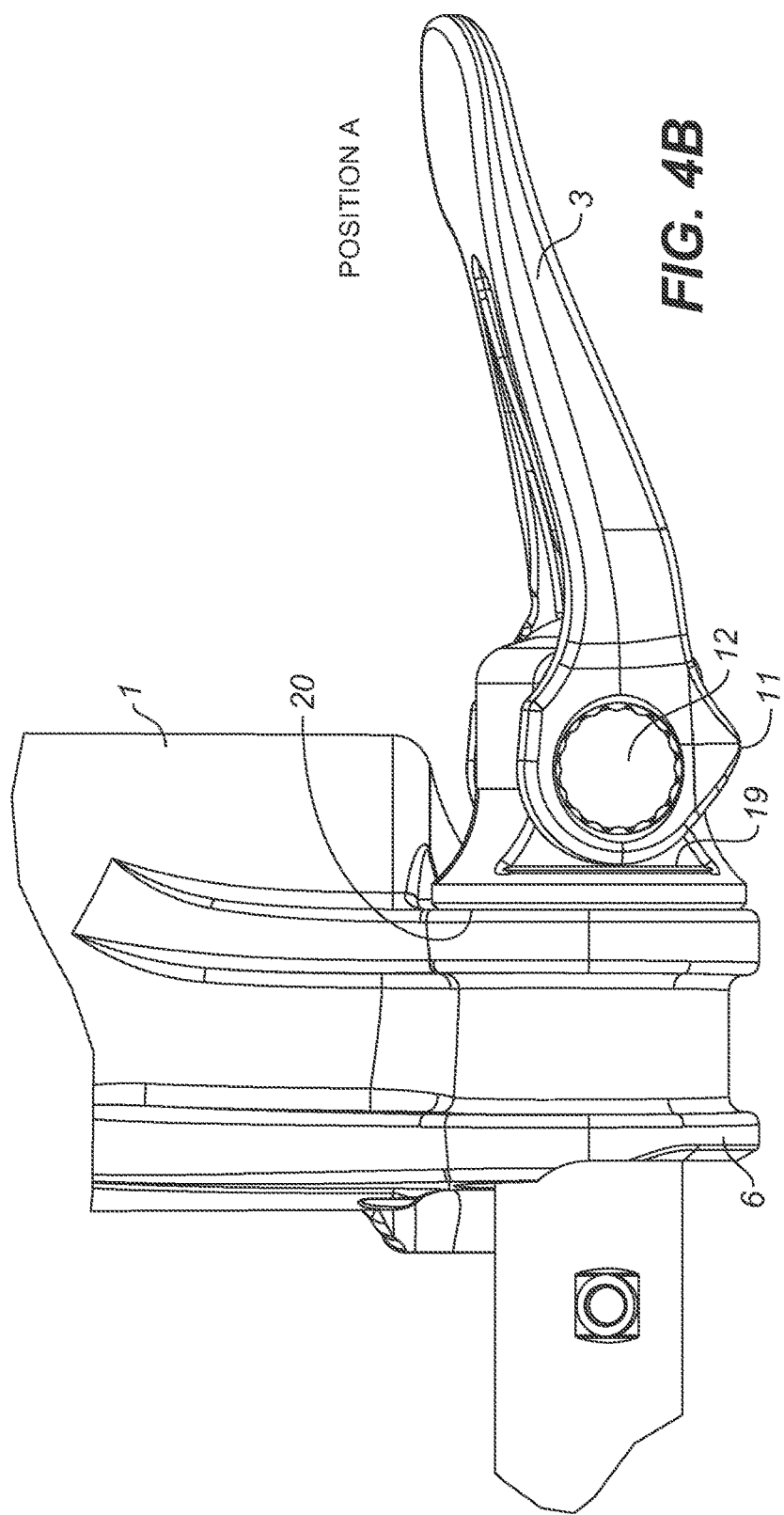

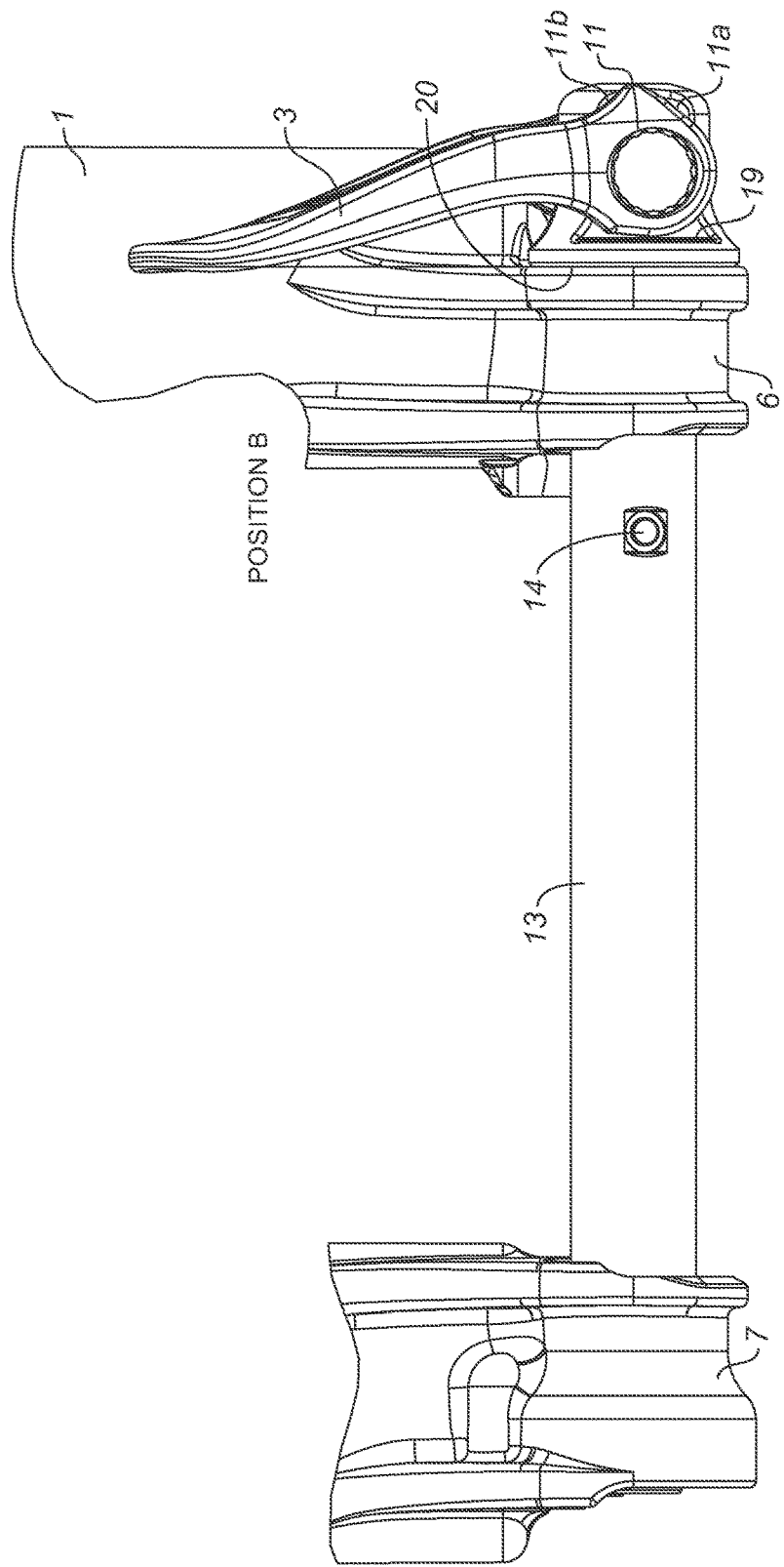

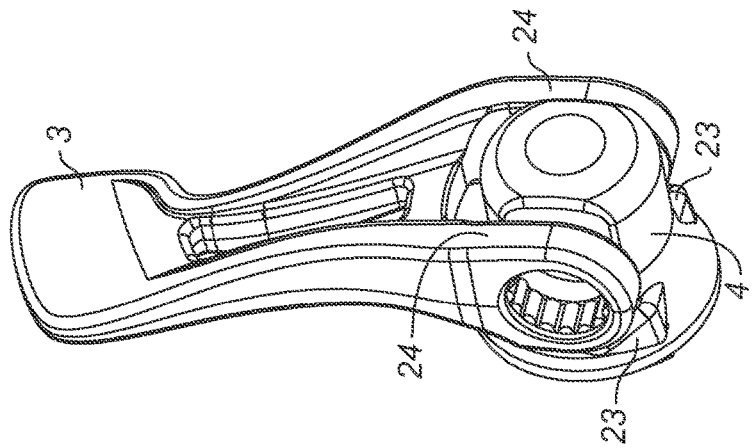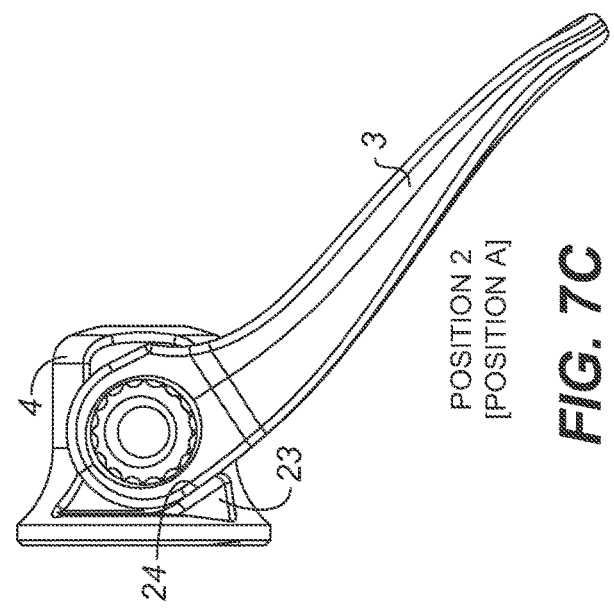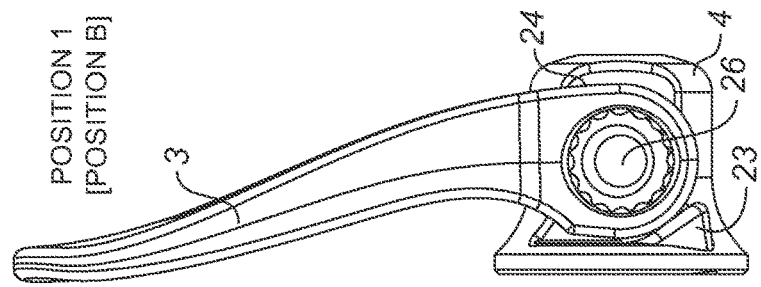

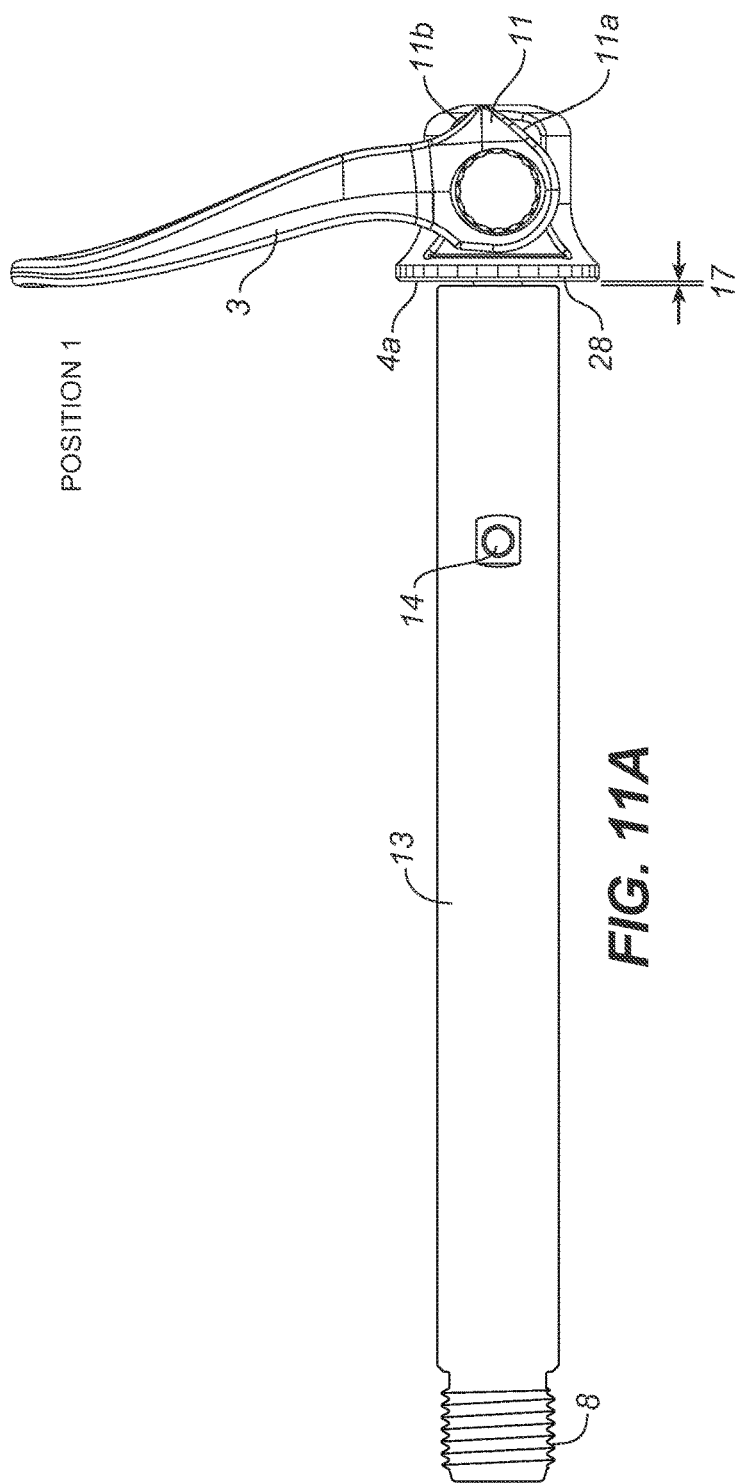

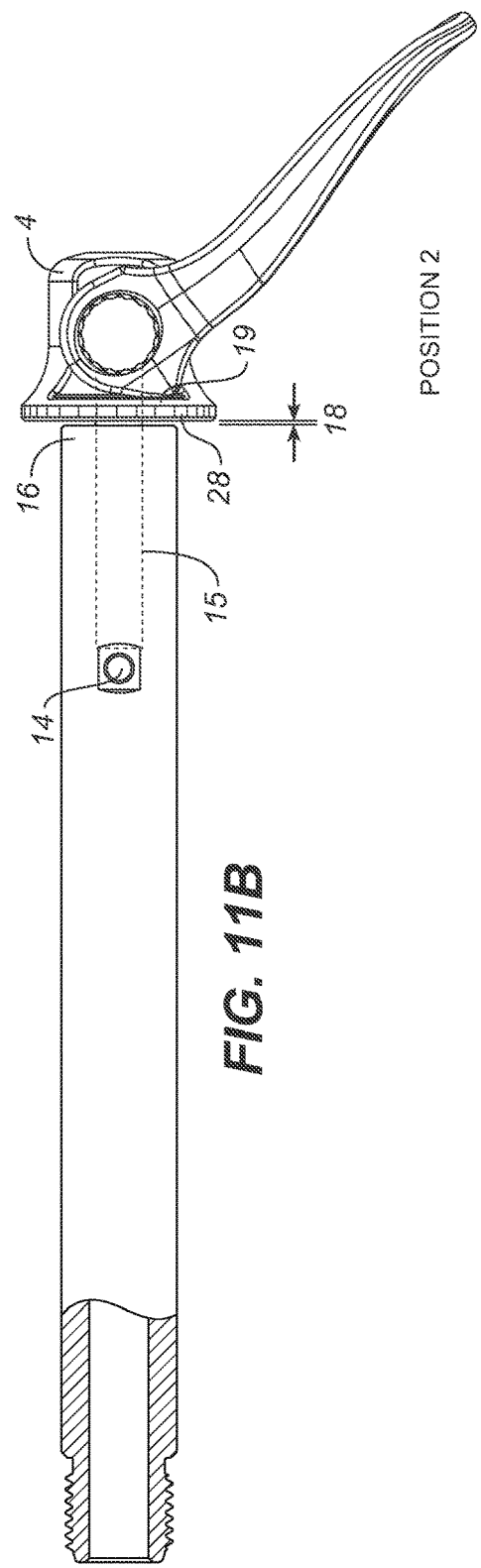

METHODS AND APPARATUS FOR RELEASABLY SUPPORTING A VEHICLE WHEEL ASSEMBLY

CROSS-REFERENCE TO RELATED APPLICATIONS

This application is a continuation application of and claims the benefit of U.S. patent application Ser. No. 14/605,463, filed on Jan. 26, 2015, now U.S. Pat. No. 9,796,446, entitled "Methods and Apparatus for Releasably Supporting a Vehicle Wheel Assembly" by Laird et al., and assigned to the assignee of the present application, and is hereby incorporated by reference in its entirety herein.

The application with Ser. No. 14/605,463 is a continuation application of and claims the benefit of U.S. patent application Ser. No. 13/527,968 filed on Jun. 20, 2012, now U.S. Pat. No. 8,974,009, entitled "Methods and Apparatus for Releasably Supporting a Vehicle Wheel Assembly" by Laird et al., and assigned to the assignee of the present application, and is hereby incorporated by reference in its entirety herein.

The application with Ser. No. 13/527,968 is a continuation application of and claims the benefit of Ser. No. 12/470,432 filed on May 21, 2009, now U.S. Pat. No. 8,226,172, entitled "Methods and Apparatus for Releasably Supporting a Vehicle Wheel Assembly" by Laird et al., and assigned to the assignee of the present application, and is hereby incorporated by reference in its entirety herein.

The U.S. patent application Ser. No. 12/470,432 which claims priority to and benefit of U.S. Provisional Patent Application No. 61/054,852 filed on May 21, 2008 entitled "Methods and Apparatus for Releasably Supporting a Vehicle Wheel Assembly" by Laird et al., and assigned to the assignee of the present application, and is hereby incorporated by reference in its entirety herein.

All references cited in the specification, and their references, are incorporated by reference herein in their entirety where appropriate for teachings of additional or alternative details, features and/or technical background.

US GOVERNMENT RIGHTS

Not applicable.

FIELD

Embodiments of the present technology relate generally to the field of wheeled vehicles.

BACKGROUND

A mountain bike (MTB) or all-terrain bike (ATB) is a bicycle that is designed for off-road cycling where there is no man-made road surface. Mountain bikes evolved from both road bicycles and from off-road motorcycles. One view is that mountain bikes are road bikes that have been adapted to handle the more difficult and demanding off-road terrain. Another view is that a mountain bike is a lighter and human powered version of an off-road motorcycle (without motor), designed to reach those off-road areas that are inaccessible to off-road motorcycles (e.g. due to regulation and otherwise).

Since the development of early mountain bikes in the 1970s, many subtypes have developed, including cross-country (XC), freeride, downhill, and various track and slalom mountain bikes. Each places different demands on a mountain bike with the result that specialised designs and components have emerged to cater for each subtype.

For example, mountain bikes designed for downhill events have evolved with much stronger, but heavier components; a typical downhill mountain bike weighs about 18 kg (40 lbs). It is thought that many such downhill components have been adapted from off-road motorcycles. One particular example is the wheel axle used by downhill mountain bikes. The downhill mountain bike axle is subjected to very high operating stresses due to the high speed and terrain induced impacts to which the bike is subjected. Due to the severe operating stresses, the downhill bike axle is very similar to a motorcycle axle, being comparatively large in diameter (e.g. 20 mm or 30 mm) and heavy in construction to provide strength and rigidity, and is usually rigidly fixed to the mountain bike by bolts that require tools for removal.

In contrast, cross-country mountain bikes have evolved with much lighter components; a typical cross-country mountain bike weighs about 12 kg (26 lbs). Many cross country components have been adapted or borrowed from road bikes, where the requirement for lightness is paramount. One particular example is the 9 mm quick release mechanism used to attach the front and/or back wheel to a mountain bike. The cross country mountain bike benefits from the light weight and quick release (for quick race condition tire changing and fixing) features of such a road bike wheel fixing mechanism. That road bike component has been used almost "as is" on mountain bikes, despite the fact that an off-road surface typically subjects a mountain bike to much higher stresses than are typically encountered in road biking.

While cross country mountain bikes benefit from the quick release and light weight features of a hub skewer such as a 9 mm quick release, that road bike derivative system lacks the rigidity of the downhill bicycle axle system. As such cross country mountain bikes handle less precisely in difficult terrain because they tend to flex more and particularly in the front end. Additionally, while the axles used on downhill mountain bikes augment fork stiffness, which can lead to improved control and ride quality, they are too heavy and difficult to work with in cross country applications. One problem with using downhill mountain bike axles on cross country mountain bikes is that, traditionally, downhill mountain bike axles require tools and time to remove them from the bike and they are not capable of quick release. This is because a downhill ride is typically very short (e.g. like a downhill ski run, a number of minutes) in comparison to a cross-country ride (e.g. a number of hours) and there simply is no need to be able to remove and replace a wheel quickly. In contrast, the ability to remove and replace a wheel as quickly and as easily as possible is of the upmost importance in cross-country mountain biking.

US 2005/0110335 (the '335 application) discloses an axle assembly for connecting a wheel assembly to a bicycle front fork. The axle is provided with longitudinal slots at either end. A quick release skewer and cam assembly is used to move expansion elements, or "washers" into engagement with the axle so that the slotted sections are caused to expand radially against an inner diameter of the fork. A nut (or "acorn" nut as it is sometimes known) is at the opposite end of the skewer from the cam assembly. Thus, and disadvantageously, two hands are required to tighten and release the axle assembly. Therefore, the axle of the '355 application is used in a fashion very much like a standard quick release skewer. Specifically, the lever is held stationary while the nut is rotated to suit.

The axle of the '355 application, in for example paragraph 0026, includes open ended slots 25 in the axle body to facilitate radial deformation of the axle. Such slot or slots subvert the rigidity of the axle and may ultimately lead to early fatigue failure due to differential flexure (both axially and torsionally) of the axle material adjacent opposing sides of the slots (e.g. causing crack propagation from the apex of the slot). That is particularly likely regarding light weight axle materials such as aluminium. Such effect may be further exacerbated by the repeated radial expansion and relaxation, during installation and removal, of the axle "tabs" created by the slots. Such expansion and relaxation as effected by the expansion washers in repeated use amounts to cyclic bending of the "tabs." Due to the high, and relatively long duration, cyclic loading placed on a cross country mountain bike axle, built in stress risers such as those included in the '355 application are not desirable.

Further, depending on the user's adjustment of the expansion washers and the swage angle included thereon, it is possible, and in some circumstances likely, that the expansion washers will become "stuck" in the axle ends due to over-tightening. Such sticking completely subverts any quick release benefit that may have otherwise been realized.

Thus there is a need for an improved quick release which combines the stiffness and durability properties of downhill-type axles with the fast release properties of cross-country quick releases.

BRIEF DESCRIPTION OF DRAWINGS

The accompanying drawings, which are incorporated in and form a part of this specification, illustrate embodiments of the present technology for an axle for removably retaining a wheel on a vehicle, and, together with the description, serve to explain principles discussed below:

FIGS. 3A and 3B show a side view, one partly in cross section, of the axle part of the front suspension fork of FIG. 2 in a closed and open position respectively.

FIG. 3C shows a longitudinal cross-section through a shaft of the axle of FIGS. 3A and 3B.

FIGS. 4A-4D show various views of the axle of FIGS. 3A and 3B in use.

FIGS. 7A-7C show various views of a third embodiment of a lever part of an axle.

FIGS. 11A and 11B show a side view, one partly in cross-section, of the axle part of the front suspension fork of FIG. 10 in a closed and open position respectively.

DESCRIPTION OF EMBODIMENTS

Figure 1A:
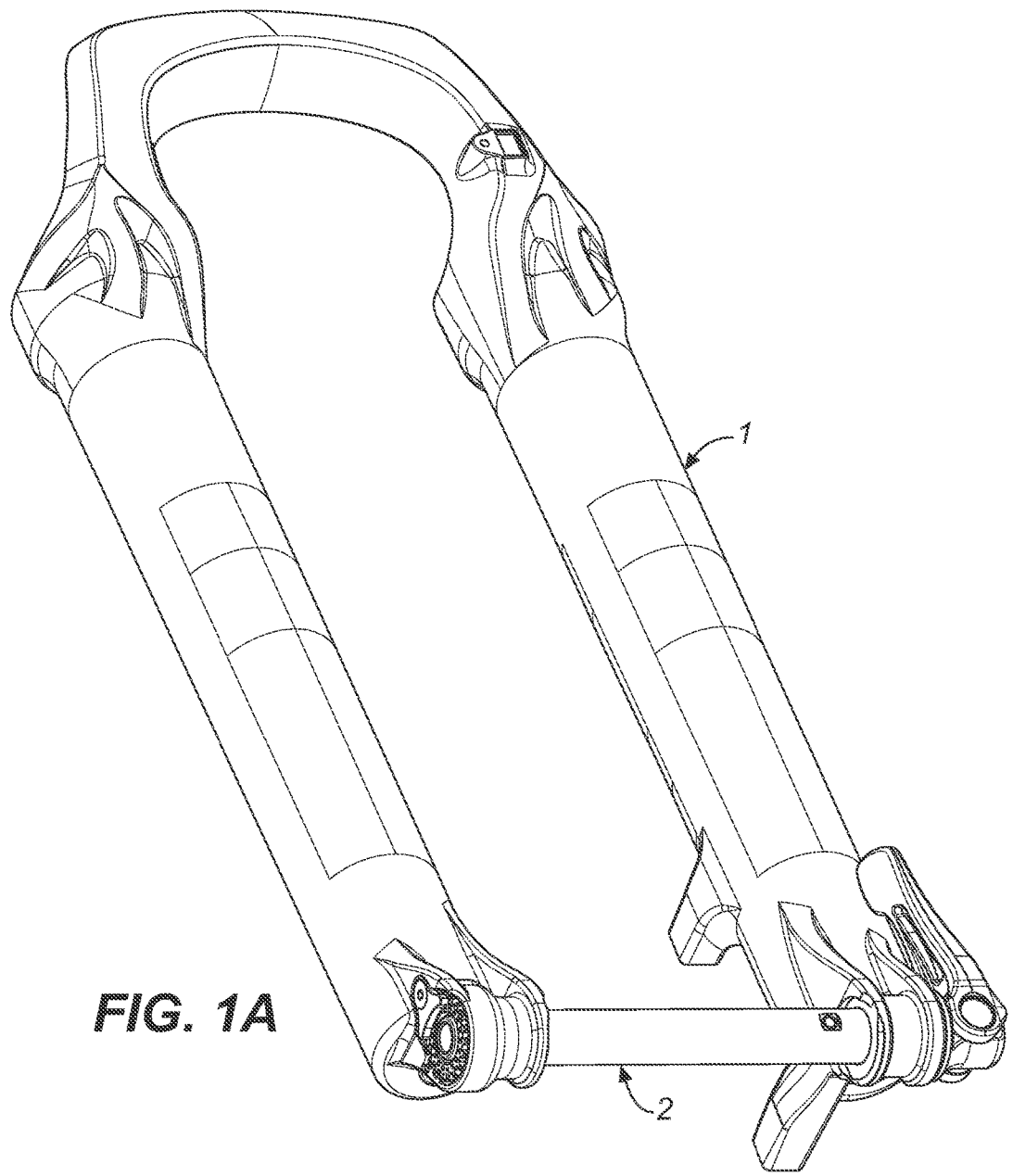
FIGS. 1A-1D are perspective views of a lower leg part of a front suspension fork comprising a first embodiment of an axle.
Figure 1B:
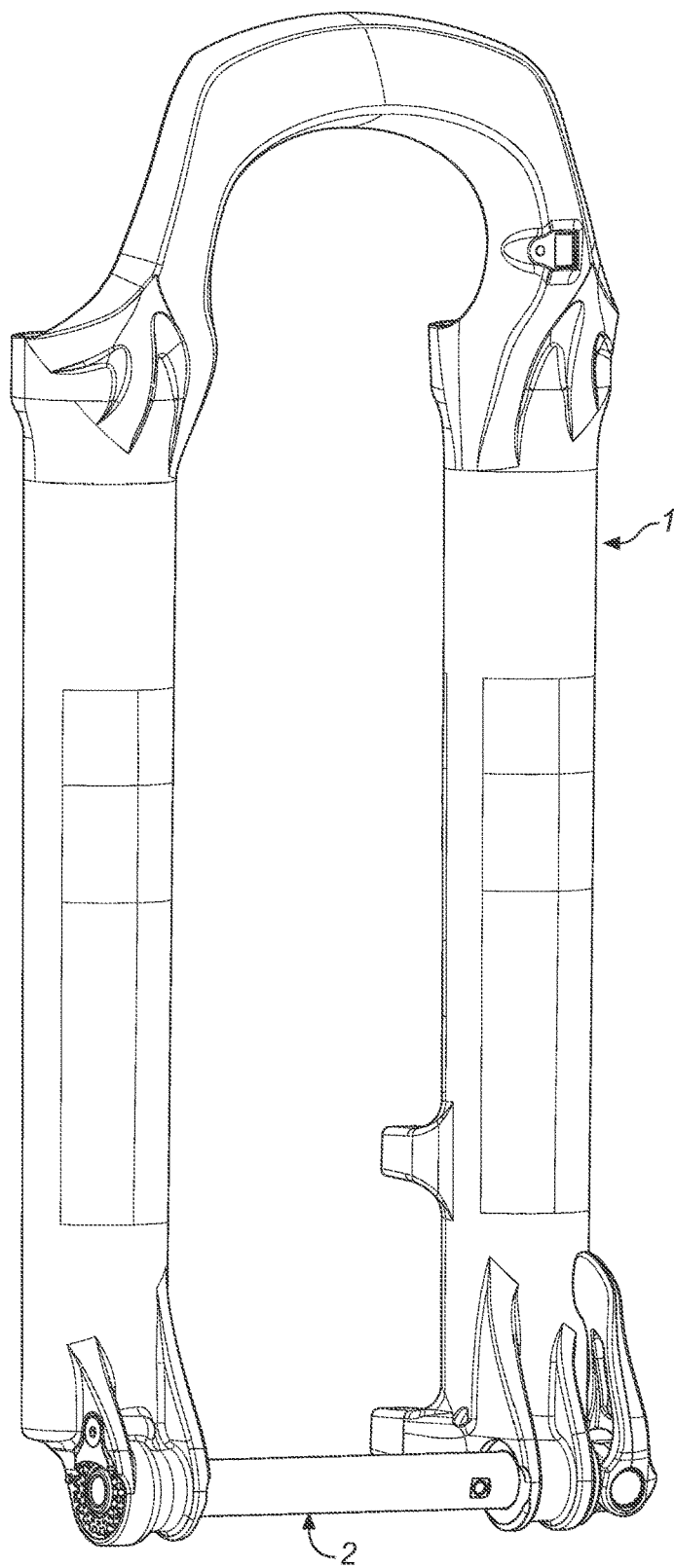
Figure 1C:
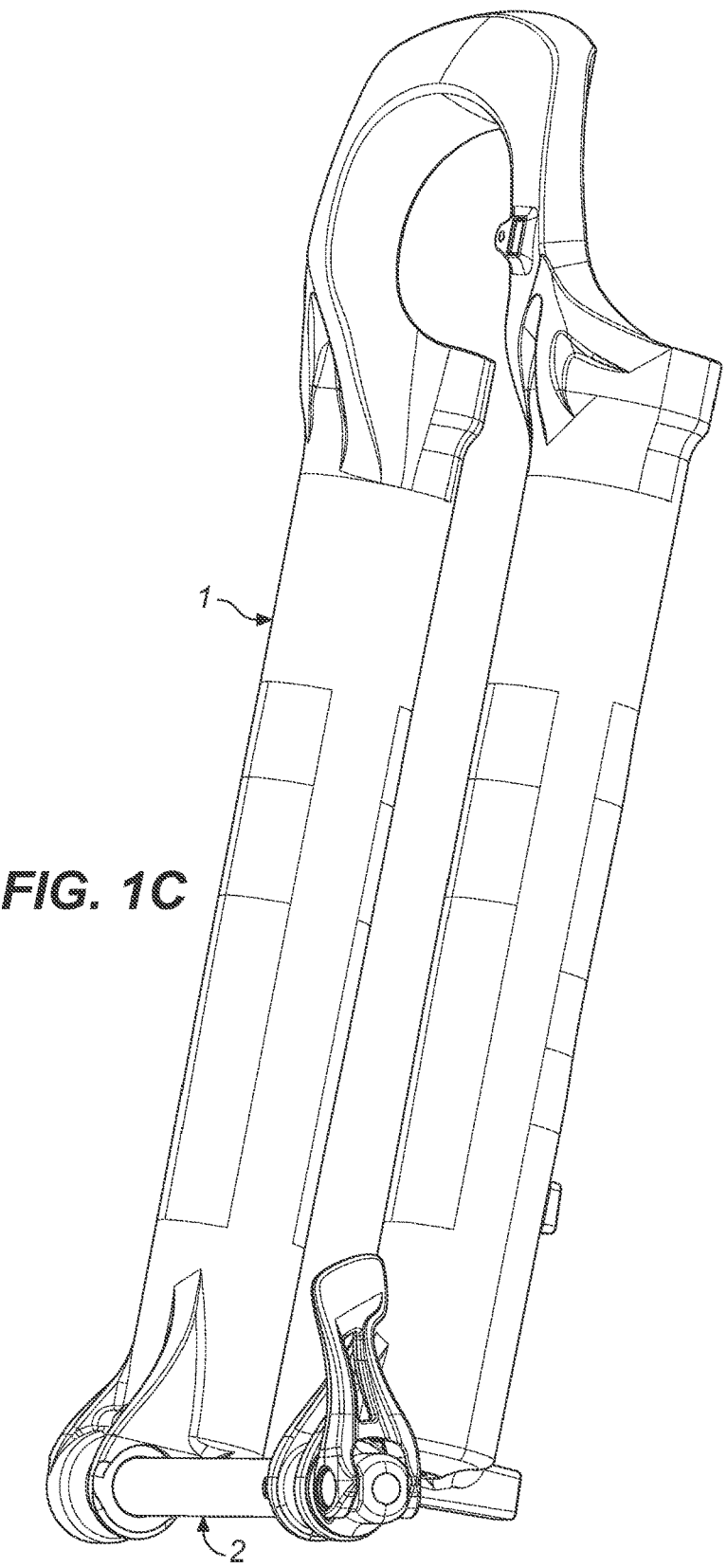
Figure 1D:

Embodiments of the present technology generally relate to methods and apparatuses for retaining a vehicle hub and wheel, for example a vehicle hub and wheel of a two-wheeled and/or man-powered vehicle such as a bicycle. Some embodiments relate to methods and apparatuses for connecting or disconnecting an axle from a suspension component. Certain embodiments relate to methods and apparatus for precisely and repeatably installing a vehicle wheel axle at a desired tension.

Some embodiments are based on the insight that the stiffness properties of an axle can be combined with the properties of a quick release to provide a quick release axle that is useful on cross-country mountain bikes for example, which requires only one hand to set and release.

In one embodiment an axle nut can be calibrated and locked in place thereby facilitating precise and repeatable make up of a quick release lever at a pre-selected orientation.

In certain aspects, one-handed operation is achieved by provision of an axle nut that, when in position on a frame component (e.g. forks) is non-rotatable. In this way, after calibrating the nut, the user need only rotate the axle using the quick release lever to attach the axle to the axle nut, and need not hold the axle nut from rotation with their other hand at the same time.

In one embodiment, a quick release lever is locked into an indexed recess that prevents vibration related rotation of the lever during use.

We have identified a further problem arising in certain situations. When using one hand to rotate the axle using the quick release lever, the rotation of the lever can be blocked by another part of the bicycle such as the cylinder of a suspension fork. We have overcome this problem by limiting the range of motion of the lever between open and closed positions (i.e. locked and released), so that the lever can be rotated to thread the opposite end of the axle into the axle nut without interfering with a component of the bicycle. During rotation the user does not have to manipulate the lever so as to avoid an adjacent bicycle component.

According to some embodiments of the present technology, there is provided an axle or axle assembly for removably retaining a wheel on a vehicle, such as a man-powered vehicle and/or two-wheeled vehicle or the like, and in certain aspects those such vehicles that utilise suspension components. The axle comprises a rotary-type connector at a first end thereof. The axle comprises a cam assembly operatively connected to the second end, the cam assembly including a cam having an axis of rotation. The axle also comprises a lever operatively connected to a second end of the axle, the lever being rotatable about an axis substantially parallel to the axis of rotation of the cam, between an open position in which the axle is removable from and mountable on the vehicle and a closed position in which the axle is retained on the vehicle. The axle also comprises a cam assembly operatively connected to the second end and a lever stop ensuring that an angle of maximum rotation for the lever from the closed position is less than 180 degrees. In some embodiments of the present technology, the axle assembly is sized and configured for use with bicycle frames and forks, such as frames and suspension forks used on mountain and all-terrain bicycles. In some aspects the axis of rotation about which the lever rotates between the closed and open positions is substantially perpendicular to the longitudinal axis of the axle. In certain embodiments a surface of rotation of the lever at its fully open position is similar to a cone; the surface of the cone does not intersect any part of the vehicle, such as a suspension fork of a bicycle. This is in contrast to conventional quick release mechanisms that, at the fully open position, rotate substantially in a plane. It is envisaged that the configuration of the lever stop may be changed, thereby changing the angle at the apex of the cone, so as to cater to different sizes and arrangements of vehicle components.

The rotary-type connector may comprise threads on the end of the axle to be received in corresponding threads of a component on the bicycle.

The lever-operated cam assembly may comprise an external or internal cam mechanism for example.

In some embodiments, there may be one or two lever stops on the cam assembly. In some embodiments, the lever stop is on the lever and engages with a corresponding surface on the cam assembly. In other embodiments, the lever stop is on a cam housing part of the cam assembly and the lever has a surface (e.g. that is substantially flat) that is brought into engagement with the lever stop. In other embodiments, the lever stop comprises a part on the cam housing and a part on the lever, which parts are inter-engageable to limit the range of motion of the lever between closed and open operations. In another embodiment there are two lever stops on the cam assembly, one on the lever and one on the cam housing. In other words, in one embodiment, the lever stop is integral with the lever. In another embodiment, the lever stop is integral with the cam assembly. In yet another embodiment, the lever stop is integral with the lever and the cam assembly.

In some embodiments, the lever is configured such that a rotation of the lever about a longitudinal axis of the axle causes engagement or disengagement of the rotary-type connector with a component part of the vehicle, and wherein the angle of maximum rotation is such that the lever is rotatable about the longitudinal axis substantially unimpeded by an adjacent part of the vehicle.

In other embodiments, the lever stop is part of the lever, or a cam assembly, or both, in parts, with the lever and the cam assembly. In any of these variants, the lever stop may be formed integrally with the relevant part. Alternatively, the lever stop may comprise a separate piece that is affixed (e.g. welded) to the relevant part.

In some embodiments, the angle of maximum rotation is between a range of 120 degrees and 165 degrees. In one embodiment, the angle of maximum rotation of the lever is about 153 degrees. Which angle is appropriate will depend on the particular configuration of the bicycle and the location of the axle and cam assembly relative to the adjacent component(s), for example a suspension fork leg.

In some embodiments, the lever is configured such that when the lever is in the closed position a substantial portion of the lever occupies a position within a recess of an adjacent vehicle component such that a portion less than a whole of the lever extrudes from the vehicle. In certain aspects the component is a fork e.g. a suspension cylinder. This helps to reduce snagging of the lever on branches for example and reduces the likelihood of accidental opening.

In one embodiment, there is provided a tension adjustment system for adjusting tension in an axle of a vehicle. The tension adjustment system comprises a component part of the vehicle comprising an axle nut receiving portion and an axle nut. The axle nut includes an index contour surface and the axle nut receiving portion includes a mating contour surface whereby an inter-engaged index contour surface an mating contour surface maintain the axle nut and the receiving portion in a relative rotational orientation. The tension adjustment system also comprises a positional retainer engaged between the receiving portion and the axle nut. The positional retainer restricts axial movement of the axle nut within the receiving portion, whereby upon moving the positional retainer the axle nut may be at least partly withdrawn from the component part, rotated to a different rotational position of a plurality of predefined rotational positions, and re-inserted into the component part, whereby re-insertion into the component part facilitates tension adjustment in the axle.

When in the component part, the axle nut is fixed rotationally by the protrusions to enable the user to screw the axle into the axle nut one-handed, that is, without having to hold the axle nut. The protrusions may comprise teeth for example that inter-engage with corresponding teeth on the component part (such as a fork bracket).

In other embodiments the axle further comprises an axle nut for receiving said rotary-type connector end of said axle, which axle nut comprises one or more protrusions on an external surface thereof, which protrusion enables selection of different rotational positions of said axle nut in a component part of said bicycle, whereby tension in said axle may be adjusted by moving said axle nut to a different rotational position in said component part. When in the component part, the axle nut is fixed rotationally by the protrusions to enable the user to screw the axle into the axle nut one-handed, that is without having to hold the axle nut. The protrusion may comprise one or more teeth for example that inter-engage with corresponding teeth on the component part (such as a fork bracket). In one embodiment, the axle nut comprises relatively few teeth (e.g. one, two, three or four) compared to a number of mating teeth provided in the component part of the bicycle (e.g. around substantially all of the inner surface of a recess in which the axle nut is received). In another embodiment, the axle nut comprises protrusions (e.g. teeth) substantially all around said external surface and the component part has comparatively few protrusions (e.g. one, two, three or four) for inter-engagement with a selected number of the protrusions on the axle nut. In yet another embodiment, each protrusion on the axle nut is shaped to slide in and out of a corresponding recess or hole in the component part of the bicycle when the axle nut is coaxial with a shaft part of the axle assembly. Of course, the recess or hole may be provided on the axle nut (as an inward protrusion) and the protrusion on the component part of the bicycle to achieve the same function. Alternatively the protrusions may comprise a number of flats, similar to the head of a nut, which provide the different rotational positions, and hold the axle nut fixed rotationally.

The tension adjustment system comprises a cam operating lever and a lever stop, the cam operating lever, when in an open position, being freely rotatable about an axle axis and relative to an axle surround portion of the component part and operatively connected to an end of the axle such that, when the axle is engaged with the axle nut, closure of the lever completes the tension adjustment.

In one embodiment, the vehicle is a bicycle. In another embodiment, the bicycle is a cross-country bicycle.

In one embodiment of the present technology, the axle is configured to be operable with a component of a vehicle, wherein the component of a vehicle is selected from a group of components of a vehicle consisting of: a fork assembly, a frame, and a wheel.

In one embodiment, the axle nut comprises an exterior surface configured to be flush with the component part while in use. In other embodiments, the exterior surface of the axle nut is recessed with the component part. In such embodiments, the axle nut may be held axially with the component part by a fastener such as snap ring or circlip for example.

In one embodiment, the positional retainer of the tension adjustment system comprises an axial retainer member configured for controlling an engagement of the axle nut with a component part of the vehicle, the axial retainer member comprising a rotatable portion. In another embodiment, the axial retainer member comprises a flange configured for retaining the axle nut in the component part while the axle is being inserted into the axle nut. In yet another embodiment, the axial retainer member comprises a flange configured for being moveable to release at least a portion of the axle nut from the component part, thereby enabling changeable rotational positions of the axle nut.

In one embodiment, the positional retainer comprises an axial retainer member or hold down, optionally having a flange for retaining the axle nut in the component part whilst the axle is inserted into the axle nut, and which axial retainer member is moveable to release at least a portion of the axle nut from the component part whereby a different rotational position of the axle nut may be selected by a user.

In one embodiment, the axial retainer member is releasably retained on the component part. The axial retainer member may be releasably retained on the component part by a screw for example.

In one embodiment, the axial retainer member is rotatable between a first position in which a part of the axial retainer member retains the axle nut in the component part, and a second position in which the part is rotated away from the axle nut whereby the axle nut is releasable from the component part.

In one embodiment, the component part of the vehicle comprises a recess configured for receiving the axle nut, the recess being shaped to receive one or more of the plurality of protrusions, whereby receipt prevents rotation of the axle nut while the axle nut is seated in the recess.

In one embodiment, a method of fabricating an axle fork assembly comprises mounting a rotary-type connector at a first end of an axle, the rotary-type connector configured to be removably coupled with an axle nut, the axle nut configured to be received by an axle nut receiving portion of a vehicle. The axle nut comprises a plurality of protrusions on an external surface thereof, the plurality of protrusions indicating a plurality of predefined rotational positions corresponding to a plurality of predefined tensions, each of the predefined plurality of rotational positions being a position at which the axle nut is held in place in the component part of the vehicle. The axle nut also comprises a positional adjustment portion configured for enabling the axle nut to be at least partly withdrawn from the component part, rotated to a different rotational position of the plurality of predefined rotational positions, and re-inserted into the component part, whereby re-insertion into the component part causes tension adjustment in the axle. The method of fabricating axle nut fork assembly further comprises mounting on a second end of the axle a lever-operated cam assembly comprising a lever mounted on a second end of the axle, said lever being rotatable between an open position in which the axle is removable from or mountable on the vehicle, the lever-operated cam assembly comprising a lever stop ensuring that an angle of maximum rotation for the lever from the closed position is less than 180 degrees.

In certain aspects the recess comprises recess teeth shaped to inter-engage with corresponding teeth on the axle nut. The recess teeth may or may not be provided around the whole circumference of the recess.

In another aspect there is provided a bicycle component, such as a suspension fork, comprising a recess for receiving an axle nut, which recess is shaped to receive one or more of protrusion for preventing rotation of said axle nut when seated in said recess. The bicycle component may also be provided with an indicator, for example an arrow, to provide a rotation reference position or calibration position of the axle nut. This helps a user to adjust the tension applied by an axle assembly during use, so that the same tension can be obtained repeatedly without having to adjust the axle nut each time.

According to another aspect, there is provided a vehicle, such as a man-powered vehicle and/or two-wheeled vehicle or the like, and in certain aspects such vehicles that utilise suspension components, comprising an axle as set out above. The vehicle may be a bicycle, such as a mountain bike which and in certain aspects may be a cross-country mountain bike. The bicycle may comprise one or more suspension component, such as front suspension forks. The suspension forks may have a range of maximum travel between 152 mm (6") and 254 mm (10") making them suitable for different applications such as cross country and downhill.

In one embodiment of the present technology, there is provided a component for a vehicle, such as a man-powered vehicle and/or two-wheeled vehicle or the like, and in certain aspects those such vehicles that utilise suspension components, comprising an axle as set out above. The vehicle component may be a fork, frame or wheel of a bicycle for example.

There is also provided for use in an axle as set out above, a lever comprising a lever stop that ensures that, in use, said lever has an angle of maximum rotation from a closed position on said axle that is less than 180°. Such a lever may comprise any of the lever stop features described herein.

In one embodiment, there is provided a method of manufacturing a vehicle, such as a man-powered vehicle and/or two-wheeled vehicle or the like, and in certain aspects those vehicles that utilize suspension components, which method comprises the step of inserting an axle as set out above into a component part of the vehicle, and rotating a lever of the axle to threadably attach the axle to the component part, a lever stop of the lever inhibiting said lever from contacting any other part of said vehicle during rotation.

In one embodiment, a method for installing an axle comprises inserting the axle having a first thread through at least one fork component and into a second thread, and rotating the first and second threads into engagement while avoiding contact between a tightening lever of the axle and the fork component.

In one embodiment, the axle is installed, as disclosed herein, into a fork component comprising a suspension component.

In yet another embodiment, an axle comprises a rotary type connector at a first end thereof, and a lever operated cam assembly having a lever connected to a second end thereof, the lever including an abutment that interferes with at least a portion of the cam assembly upon relative rotation of the lever and the portion.

In some embodiments the axle nut features as described herein may be used independently of the lever features as described herein. In particular, the axle nut may be used with a cam assembly that has a lever without a limited range of movement between open and closed positions, for example a lever that is able to rotate 180°.

In one embodiment of the present technology, an axle for removably retaining a wheel on a vehicle, such as a man-powered vehicle and/or two-wheeled vehicle or the like, and in certain aspects those such vehicles that utilize suspension components. The axle comprises a rotary-type connector at a first end thereof, a lever-operated cam assembly comprising a lever mounted on a second end of the axle, which lever is rotatable between an open position in which the axle is removable from or mountable on the vehicle, and a closed position in which the axle is retained on the vehicle, and an axle nut for receiving the rotary-type connector end of the axle, which axle nut comprises protrusions on an external surface thereof, which protrusions predefine different rotational positions for holding the axle nut in a component part of the vehicle, whereby tension in the axle may be adjusted by at least partly withdrawing the axle nut from the component part, rotating the axle nut to a different rotational position and re-inserting in the component part. The axial retainer member, which may be a hold down, optionally having a flange for retaining the axle nut in the component part whilst the axle is inserted into the axle nut, and which flange is moveable to release at least a portion of the axle nut from the component part whereby a different rotational position of the axle nut may be selected by a user. The axle nut may be provided with any of the axle nut features described herein. The vehicle may be a bicycle such as a mountain bicycle, for example. The component of the vehicle may be a fork, frame or suspension fork, for example.

In one embodiment, a method for installing an axle in a fork or suspension fork of, for example, a two-wheeled vehicle such as a bicycle, comprises inserting an axle through a first fork leg and then into a second fork leg. Then an axle nut is inserted into the second fork leg. A thread of said axle is engaged with a mating thread of the axle nut. The thread is made up into the mating thread until a flange of the axle nut is proximate a surface of the first fork leg. A distance between an orientation of a lever of the axle at make up and a desired orientation of the lever is determined. An axle nut position indicator is read and an indicator increment adjustment required for adjustment of said lever to a desired orientation is determined. The axle is removed from said axle nut. An orientation of said axle nut is adjusted based on a determined indicator increment. The axle nut within the second fork leg is replaced. The axle nut within said second fork leg is then fixed.

In one embodiment, the axle is rotated while automatically maintaining clearance between the lever of the axle and the first fork leg. The automatic clearance may be provided by a lever stop, for example, which limits how far the lever can open.

In one embodiment, a method for installing an axle in a fork or suspension fork, for example of a two-wheeled vehicle such as a bicycle is shown. The method for installing an axle comprises inserting an axle though a first fork leg and into a second fork leg, inserting an axle nut into the second fork leg, engaging a thread of the axle with a mating thread of the axle nut, rotating the axle while automatically maintaining clearance between a lever of the axle and the first fork leg, making the thread up into the mating thread until a flange of the axle is proximate a surface of the first fork leg, and moving the lever to a closed position whereby the flange is brought into engagement with the surface of the first fork leg so that the axle is releasably mounted to the suspension fork. The method may further include fixing the axle nut within the second fork leg before the engaging a thread of the axle with a mating thread of the axle nut.

An axle assembly for a two wheeled vehicle is disclosed herein. One embodiment is suited for the retaining and quick release of a bicycle wheel and is described, for example, by reference to a front bicycle wheel retained in a suspension component such as a bicycle front fork. It is noted that the rear axle stays of a bicycle (or motorcycle) also form a "fork" and that embodiments as disclosed herein are equally suitable for use thereon and are contemplated for advantageous use therewith. For further reference a bicycle axle assembly is shown and described in U.S. Pat. No. 7,090,308 which is incorporated herein in its entirety by reference.

Figure 2:
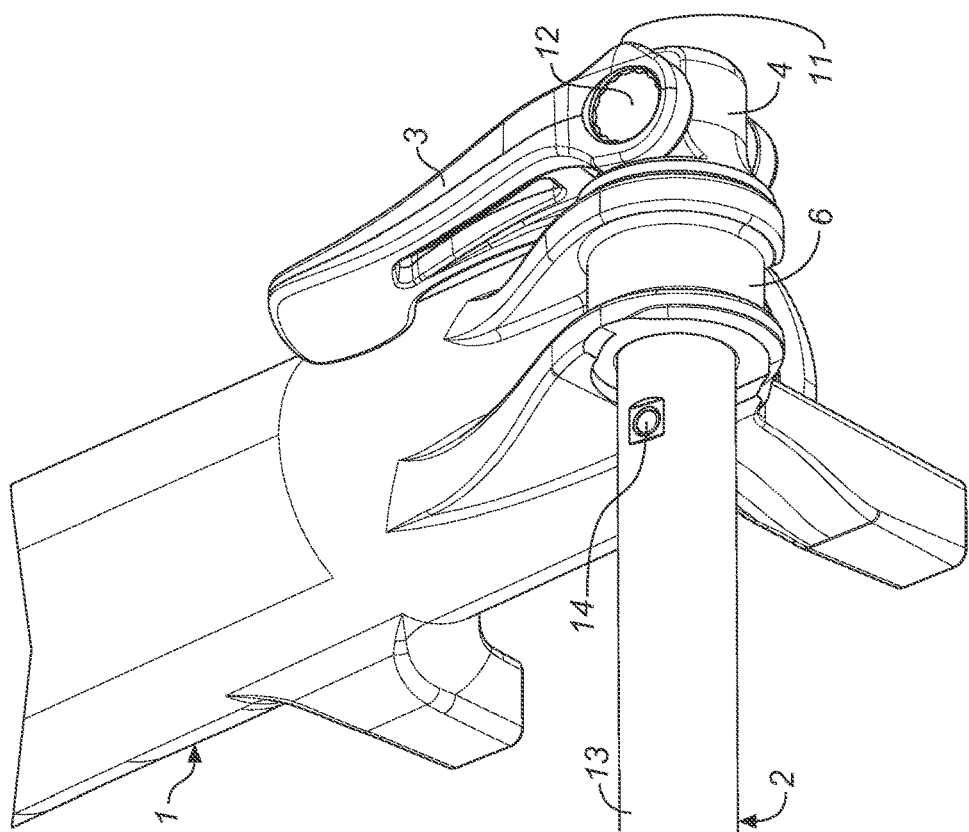
FIG. 2 is a perspective view of part of the front suspension fork of FIGS. 1A to 1D.
Figure 3E:
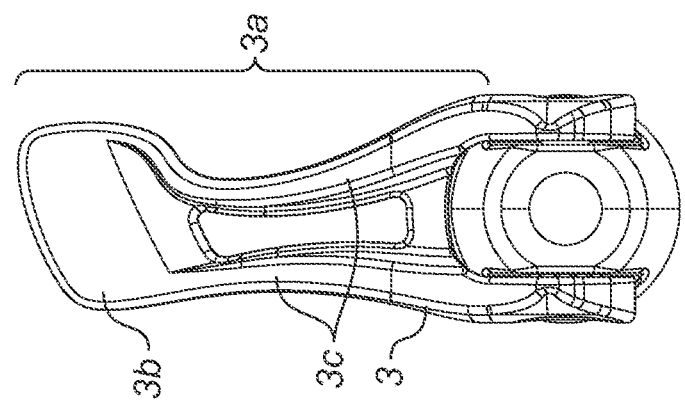
FIGS. 3D and 3E show respective end views of the axle of FIGS. 3A and 3B.
Figure 3D:
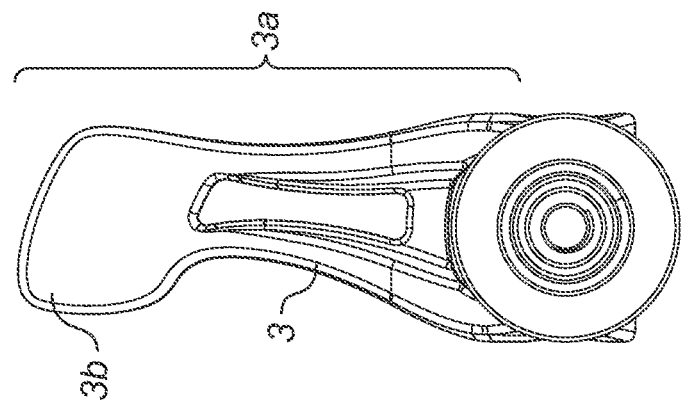
Figure 4A:
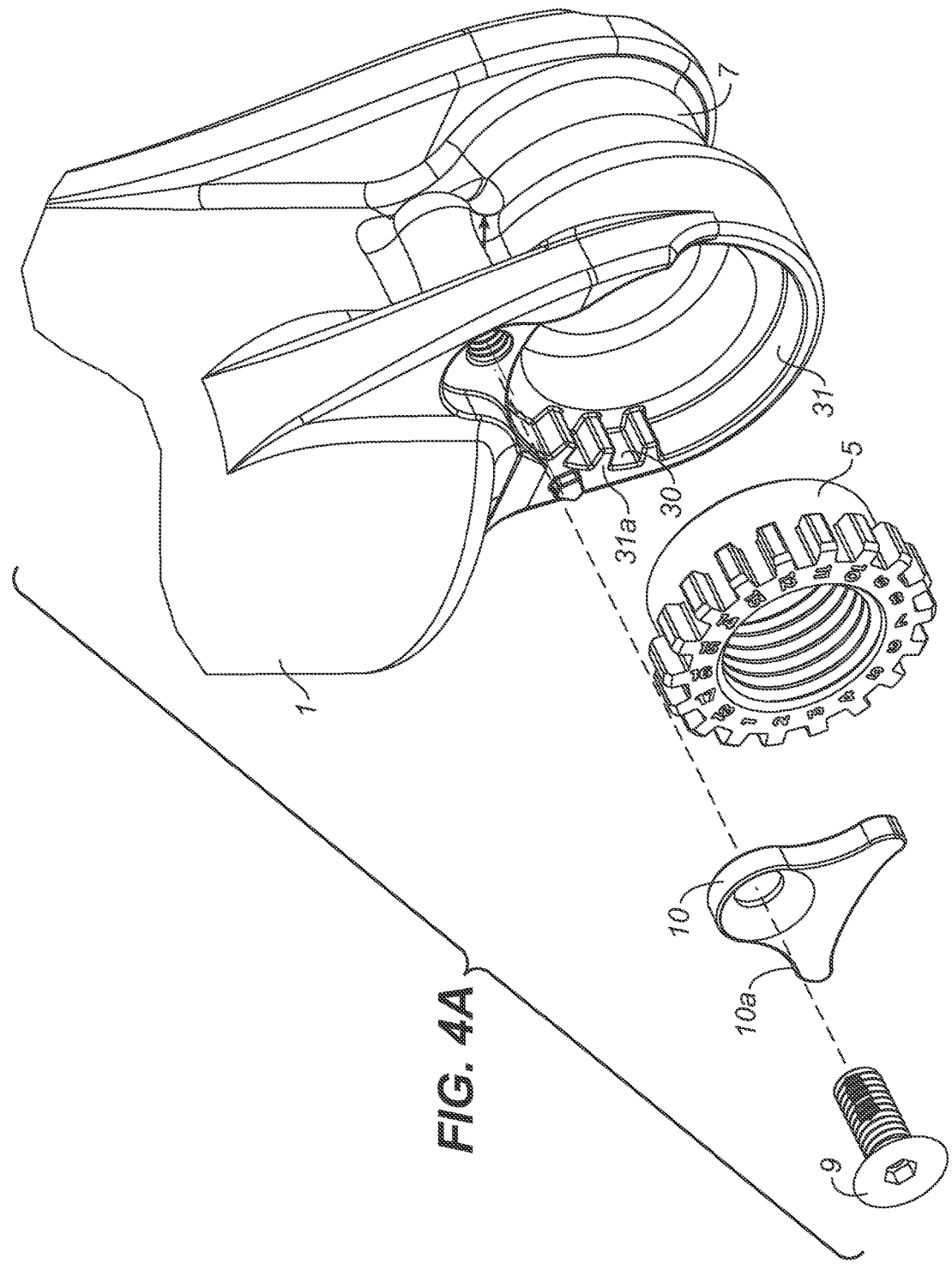
Figure 4D:
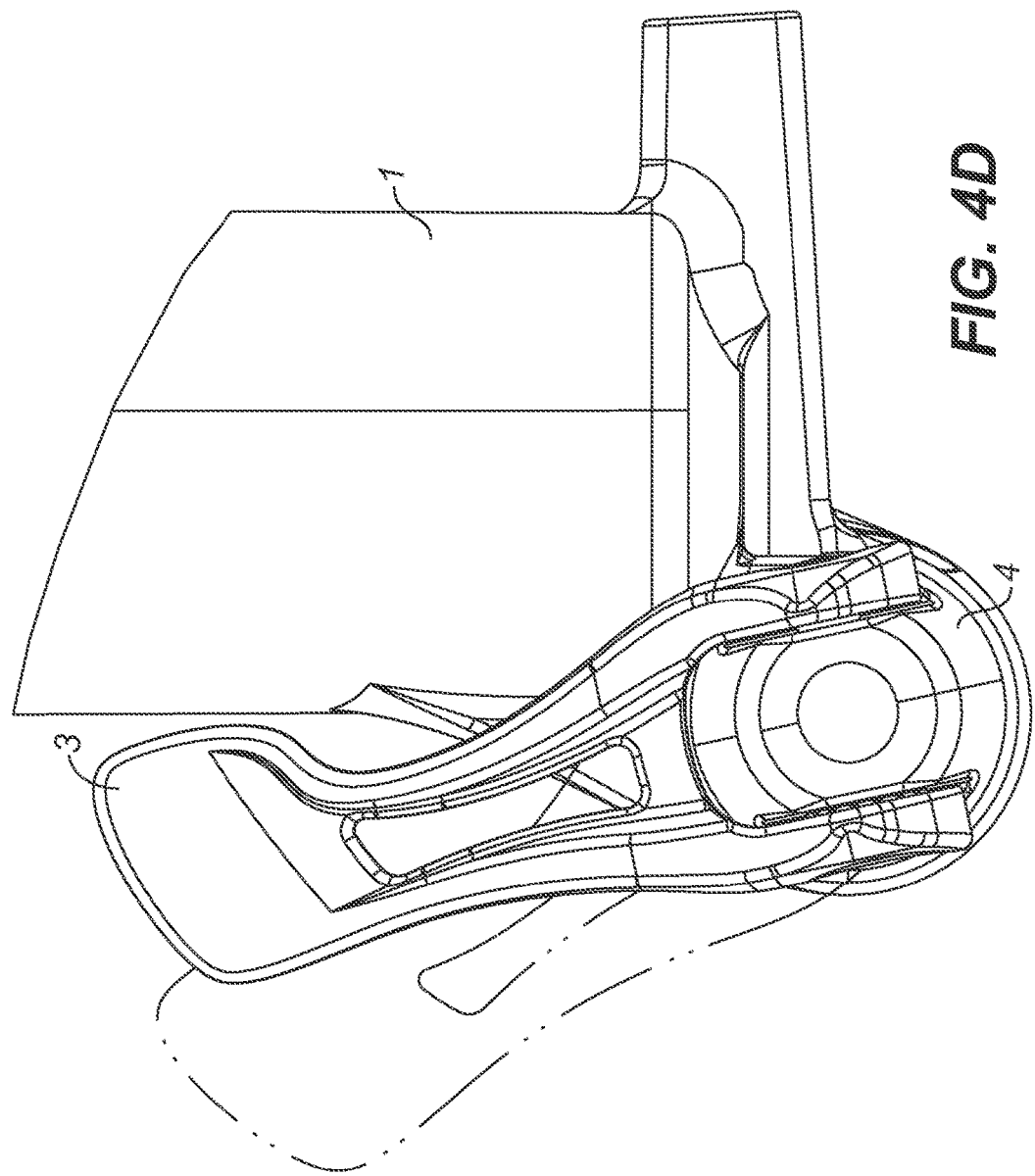

FIGS. 1A through 1D show a lower leg portion 1 of a bicycle suspension fork having an embodiment of an axle assembly 2 installed therein. These Figures show only the lower leg part of a suspension fork i.e. the steerer, crown and piston legs are not shown. Furthermore, a bicycle wheel, such as would be retained by the axle assembly 2 when in use, is not shown. FIG. 2 is an expansion of part of FIGS. 1A-1D and shows the lower leg portion 1 having the axle assembly 2 installed therein.

As shown in FIGS. 1A-1D and 4A-4D, the lower fork legs 1 each include one of a lever axle bracket 6 and nut axle bracket 7 (corresponding roughly to bicycle fork "drop outs" but completely enclosing a circumference) for retaining the portion of an axle shaft 13 of the axle assembly 2 supported by the corresponding fork leg 1. In this way a wheel can only be fitted and removed from a bicycle or other vehicle by axial movement of the axle shaft 13 along the axis of the lever axle bracket 6 and nut axle bracket 7, in contrast to radial fitting and removal permitted by drop outs.

FIGS. 3A-3D show an embodiment of the axle assembly 2 comprising a lever 3, a cam housing 4, and the axle shaft 13. In one embodiment the cam housing 4 is made from aluminium alloy and has a shape that very approximately corresponds to that of a bell with a flattened top. The cam housing comprises an annular surface 4a for engagement with an axle bracket part of the suspension fork, as described in greater detail below. In one embodiment the lever 3 is made from aluminium alloy and comprises a handle portion 3a and a cam shaft 12 disposed at 90° thereto that passes through the cam housing 4.

Generally, aluminium, alloys thereof and other materials disclosed herein are by way of example and other suitable materials or combinations thereof may be used.

In one embodiment and referring to FIG. 3A the shaft 13 is made from aluminium alloy (such as 7075-T73 or 7075-T7352) and is substantially hollow along its entire length. The shaft 13 is 143.7 mm long, and has a maximum external diameter of 14.9 mm. Internally, the shaft 13 has three distinct regions: from right to left in FIG. 3C, a first region of 18 mm length and 11 mm internal diameter; a second region comprising threads of 6 mm internal diameter and extending 16 mm along the inside of the shaft 13; and a third region of 7.7 mm internal diameter and 109 mm in length. In use, the first region does not see any tensile stress since a cam follower shaft 15 pulls outwardly on the third region of the shaft 13 via the threads of the second region. Hence the wall thickness of the third region is greater than that of the first region.

The shaft 13 has a bolt end 8 that is provided with threads that extend approximately 12 mm in from the leftmost end (as viewed in FIG. 2) of the shaft 13. In use, the bolt end 8 is releasably threaded to an axle nut 5 as described in greater detail below.

In one embodiment the opposite, lever end of the shaft 13 has no threads; instead the cam follower shaft 15 (shown by hidden lines) is coaxially located in the shaft 13. The cam follower shaft 15 comprises a steel shaft having external threads (not shown) at one end and a transverse bore at its opposite end for receiving a cam shaft 12. The cam follower shaft 15 is attached proximate its innermost end to the shaft 13 by the external threads that mate with the internal threads inside the shaft 13. The cam follower shaft 15 is held in rotational position by a pin 14 which penetrates the wall of the shaft 13 at two points opposite one another and each at approximately 90 degrees to the longitudinal axis of the shaft 13. It is to be noted that the cam follower shaft 15 does not extend the full length of the shaft 13. This is in contrast to existing quick release skewers which span at least the distance between dropouts. A shorter cam follower shaft 15 reduces the amount of elastic stretch of the cam follower shaft when the axle assembly 2 is in use, which in turn reduces any propensity for elastic vibration loosening of the quick release lever.

In one embodiment the cam housing 4 is mounted and retained on the opposite end of the cam follower shaft 15 by the cam shaft 12 that passes through the bore in the cam follower shaft 15. The cam shaft 12 is rotatable in the bore via lever 3. Thus a cam surface (not shown) of the cam shaft 12 is enclosed by the cam follower shaft 15 within the cam housing 4. Rotation of the cam shaft 12 via the lever 3 causes the cam housing 4 to move either axially inward or outward relative to the shaft 13 as described in greater detail below.

Alternatively, the end 15 of the cam follower shaft may enclose a non-cam portion of the cam shaft 12 while cam surfaces external of the cam housing 4 interact with exterior surfaces of the cam housing 4 to effect the same movement. An example of such a cam skewer is shown in FIG. 1 of U.S. Pat. No. 7,090,308.

The net result of the cam type mechanism is described herein and operates substantially as such regardless of which specific embodiment is used. The cam surface pivots about the same axis as and is connected to cam shaft 12 which in turn is rotationally fixed relative to lever 3. When lever 3 is rotated from position 1 to position 2, the cam shaft 12 correspondingly rotates. That causes the cam (not shown) within the cam housing 4 to move the cam housing 4 further from the cam end 16 of the shaft 13. Stated another way, when lever 3 is rotated from the position 1 to the position 2, the dimension 17 (defined at position 1) increases because although the cam shaft 12 is fixed through, and fixed relative to the axis of, the cam housing 4, the cam shaft 12 is not rotationally fixed relative to the cam housing 4. As the cam surface (not shown) rotates relative to the cam follower shaft 15 (by rotation of the lever 3 and corresponding cam shaft 12) the cam surface moves the lever 3, cam housing 4 assembly axially relative to the axis of the shaft 13.

In one embodiment and referring again to FIGS. 3A-3E, the handle part 3a of lever 3 comprises a finger tab 3b and a pair of curved arms 3c that connect the finger tab 3b to the cam shaft 12. The furthermost point of the finger tab 3b from the axis of rotation of the lever 3 makes an angle of about 10° from the vertical in position 1. In this way most of the lever 3 is kept inside the line of the fork to reduce the chance of snagging and accidental release during use. The cam shaft end of each of the arms 3c comprises a respective lever stop 11. Each lever stop 11 comprises a raised surface or "abutment" whose function is to stop rotation of the lever at position 2 when moving from position 1 to position 2 i.e. before the lever can rotate 180° from position 1. In this way the lever 3 has an open position that is less than 180° from its closed position. In this particular embodiment, the lever 3 can open no more than 153 degrees from position 1. This angle enables the lever 3 to be rotated one-handed about the axis of shaft 13 without coming into contact with the fork leg. For example a user can hold the bicycle upright with one hand, and with the other rotate the lever 3 about the axis of shaft 13. This functionality can be achieved using other angles and we have found that stopping movement of the lever anywhere between about 120° and 165° from the closed position is workable. Other angles may work as well depending on circumstances. For example, there will be a dependence on the diameter of the fork leg and on the relative position of the lever relative to the fork leg (based on the amount of desired fork leg shielding of the lever in the closed position) which determines what range of angles will function in any particular case.

In one embodiment and referring to FIG. 3A, each lever stop 11 comprises a pair of surfaces 11a, 11b that are disposed at about 90 degrees to one another to form a raised region or point that, when viewed side on as in FIGS. 3A and 3B, lies substantially in the same plane as the top of the cam housing 4. In the closed position, the line lying at 45 degrees between each of the surfaces 11a, 11b does not lie on the axis of the shaft 13, although this is not essential. In one embodiment the lever stop 11 comprises a discontinuity in the radius of curvature of the lever or cam housing, or both (for example a significant reduction in the local radius of curvature). In one embodiment, the lever stop 11 comprises an increased thickness, as measured in a relevant plane, of the lever or the cam housing or both.

When the lever 3 is rotated from position 1 to position 2, the surface 11a of each lever stop 11 interferes with surface 19 of the cam housing 4 to prevent further opening rotation of the lever 3. As shown in FIG. 3B, the surface 19 lies substantially at 90 degrees to the axis of the shaft 13. Adjustment of the angle that the surface 11a makes with the horizontal when in position 1 will serve to adjust how far the lever 3 can open. Alternatively, the angle of the surface 19 may also be adjusted (e.g. to provide a raised mating surface) for abutment with the surface 11a so that position 2 is defined by the combination of the angles of the mating surface and surface 11a.

We have observed that while some levers of the prior art have a permanently bent configuration, so that a portion of the lever is outwardly ("away" from the bicycle) directed when the lever is open, those levers still rotate at least 180 degrees from the closed position. If, hypothetically, a lever has a bent configuration, so as to clear (when rotated) a fork leg for example, then when closed at 180 degrees that lever will impinge upon the spokes of the bicycle wheel or brake disc (causing damage) or will impinge upon a portion of the fork drop out resulting in insufficient closure (and corresponding danger to the user when riding the bicycle).

Figure 9A:
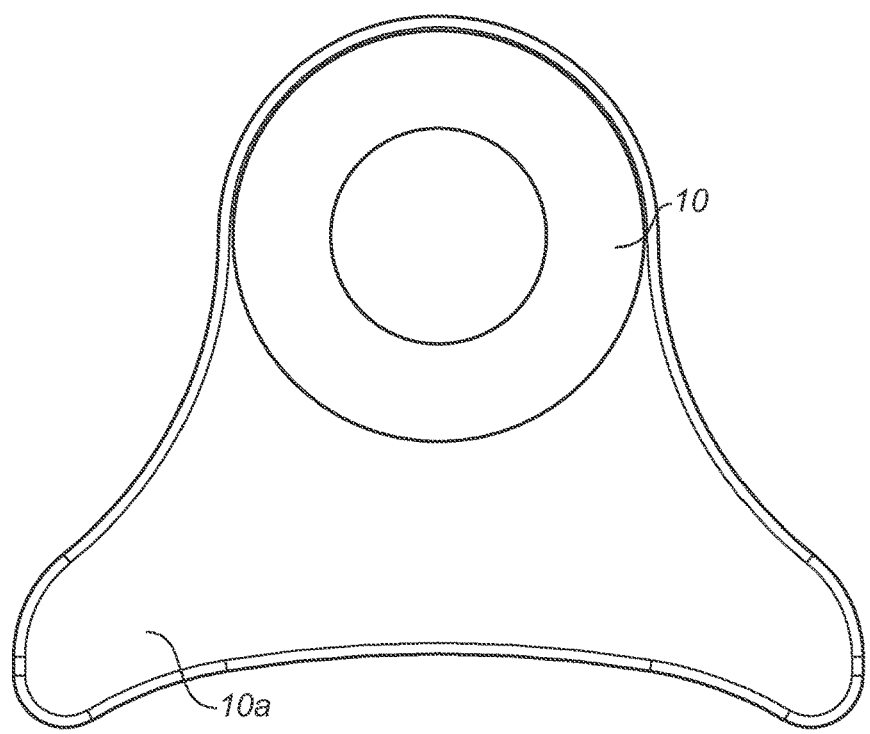
FIG. 9A shows a side view of a hold down of the axle of FIGS. 3A and 3B.
Figure 9B:
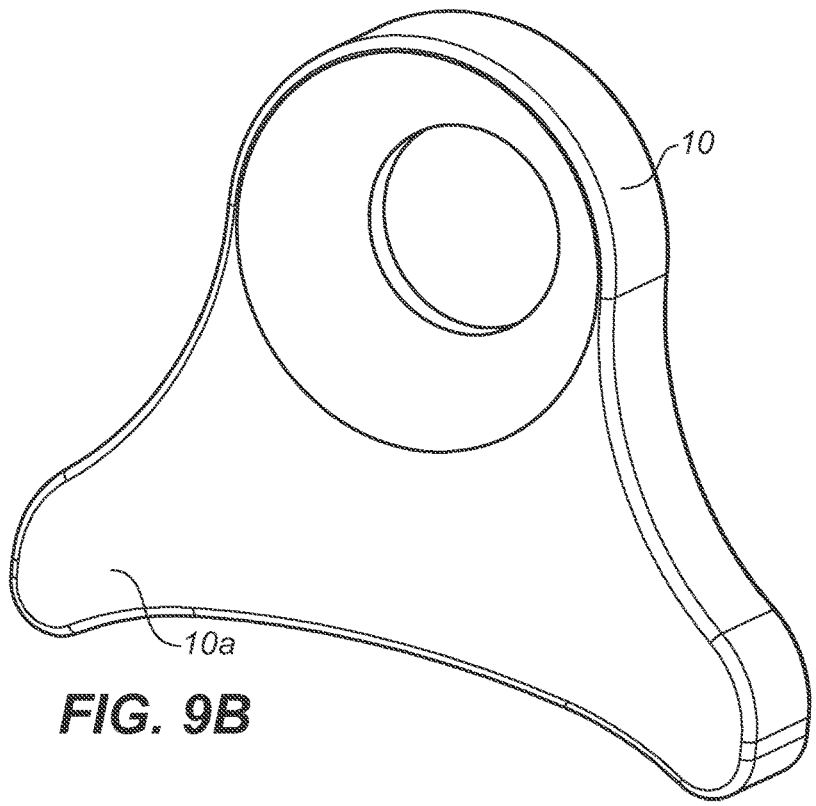
FIG. 9B is a perspective view of the hold down of FIG. 9A.
Figure 10:
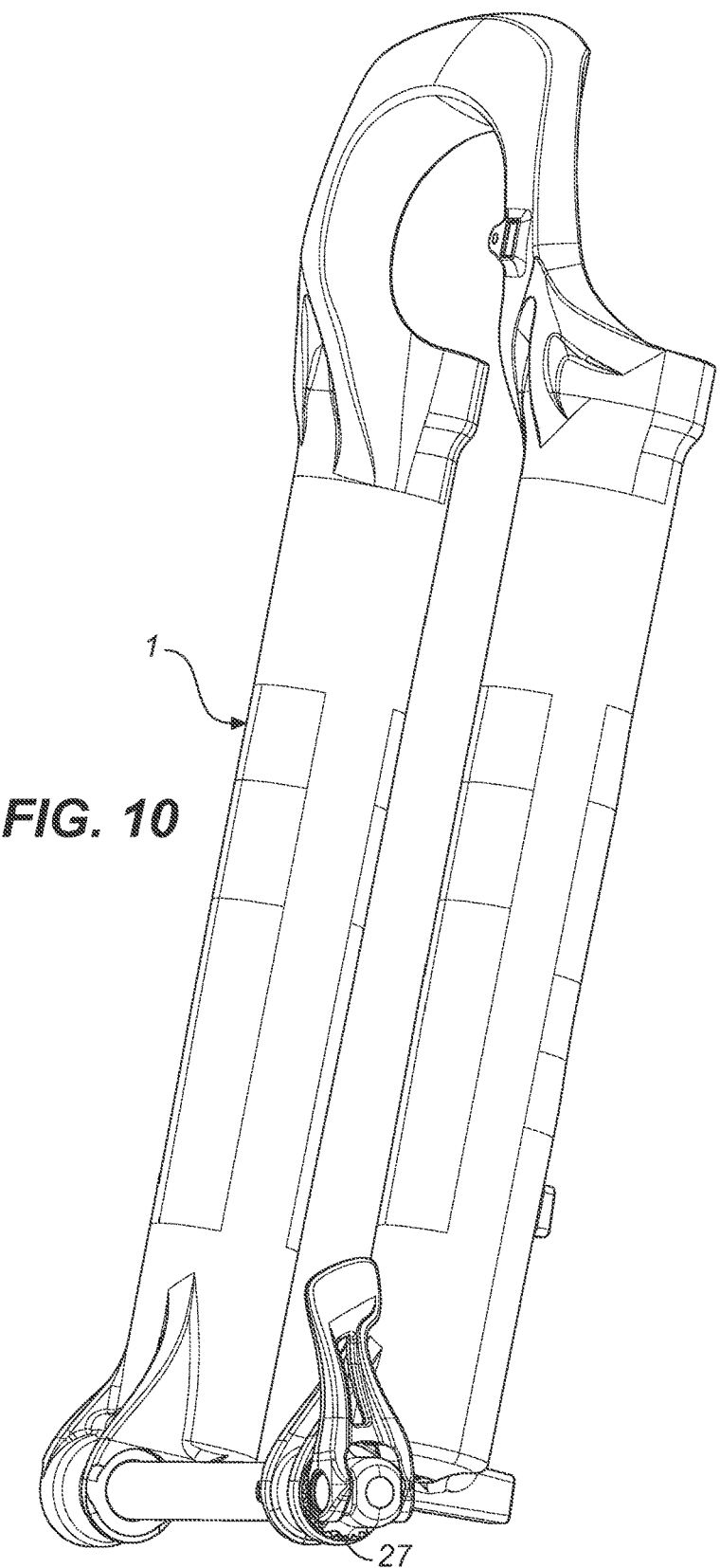
FIG. 10 is a side perspective view of a fifth embodiment of an axle.
Figure 11D:
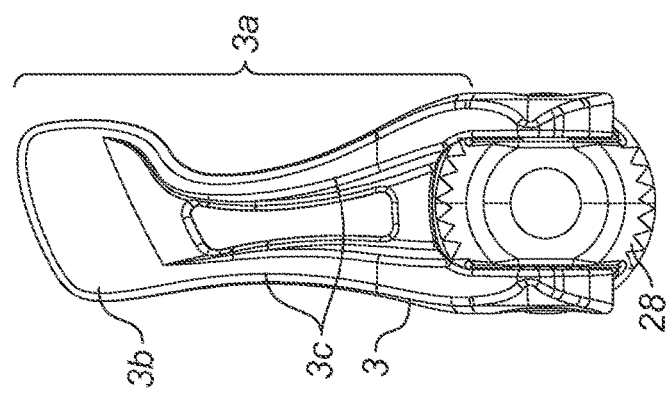
FIGS. 11C and 11D show respective end views of the axle of FIGS. 11A and 11B.
Figure 11C:
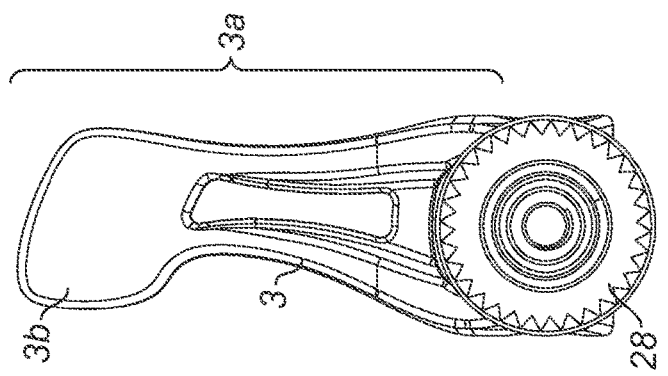

Referring to FIGS. 4A-4D the axle nut bracket 7 at the lower end of the other fork leg 1 comprises a recess 31 for receiving the axle nut 5. In one embodiment, the axle nut 5 sits wholly within the recess 31 so that its exposed surface is flush or sub-flush with the bracket 7. Once the axle nut 5 has been inserted into the recess 31, an axial retainer member, which in this embodiment is an axle nut hold down 10 is secured to the bracket 7 by a screw 9. The axle nut hold down 10 is shown in greater detail in FIGS. 9A and 9B. It comprises a flange 10a for overlapping a portion of the axle nut 5 to prevent the axle nut from being pushed out of the recess 31 during installation of the shaft 13, as will be described in greater detail below. It is noted that other mechanisms may serve functionally as the axle nut hold down 10. In one embodiment the axle nut 5 is sub-flush within the recess 31 and recess 31 includes an inner diameter circumferential groove located axially just outward from an axially outboard surface of the installed nut 5. The axial retainer member comprising an inner diameter "snap ring" or "C-ring" is installed (e.g. by suitable contraction via snap ring spanner and subsequent release in situ) in the groove and as installed forms an inner diameter that is smaller than an outer diameter of nut 5 where the ring axially abuts a substantially circumferential area of the outboard surface. In one embodiment a lock nut is counter threaded into a threaded portion of surplus recess formed by the sub-flush mounted nut 5. In one embodiment a locking pin is driven though the recess 31 and the nut 5 at an angle substantially perpendicular to the axis of the nut 5.

Figure 5A:
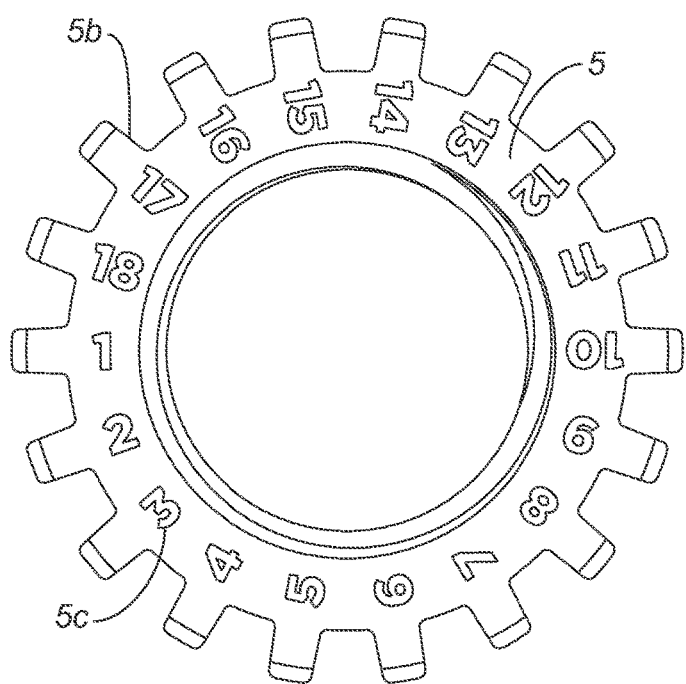
FIG. 5A is a plan view of an axle nut of the axle of FIGS. 3A and 3B.
Figure 5B:
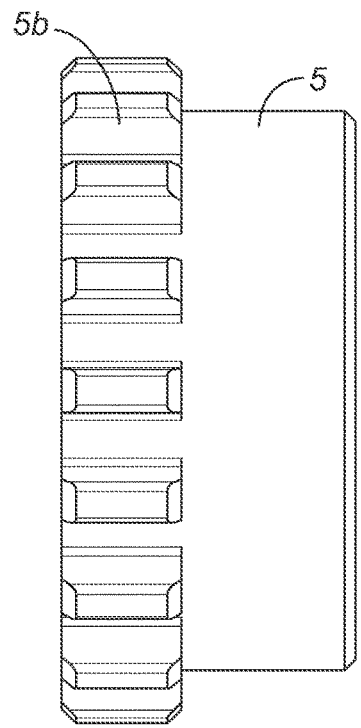
FIG. 5B is a side view of the axle nut of FIG. 5A.
Figure 5C:
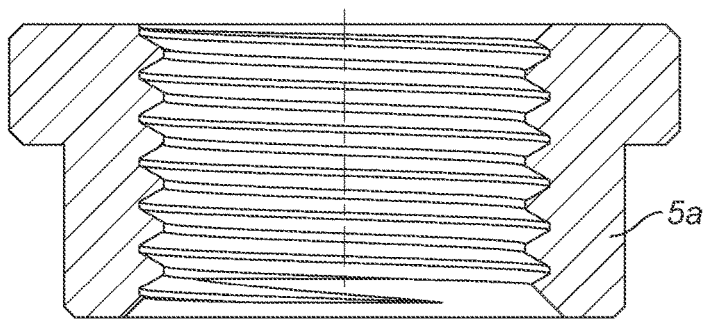
FIG. 5C is a side cross-section through the axle nut of FIG. 5A.

The axle nut 5 is shown in greater detail in FIGS. 5A-5C. In one embodiment it is made from 6061-T6 aluminium alloy and has a diameter of about 20 mm and a depth of 10 mm. The axle nut 5 comprises internal threads 5a for receiving the external threads on one end of the shaft 13. The axle nut 5 comprises around its circumference a series of protrusions whose function is to hold the axle nut 5 rotationally fixed when located fully in the recess 31. In this embodiment the protrusions comprise a series of eighteen teeth 5b disposed at 20° intervals around the circumference of the axle nut 5. As shown, each tooth 5b does not extend across the entire depth of the axle nut 5, but extends from the outer edge to a point slightly under halfway across the depth. In this way, the axle nut 5 can be axially rotated by pulling the nut only part way out of the recess 31. Each tooth 5b is identified by a respective number 5c that is laser-etched onto the outward-facing surface of the axle nut 5. In one embodiment, the axle nut 5 includes radially oriented "teeth" on its axially inboard surface (opposite the outboard surface that in one embodiment includes the indexing marks) wherein the teeth extend in the direction from a center of the nut 5 toward an outer circumference substantially along at least a portion of a radius. The outboard axial surface, within the recess 31, of the axle nut bracket 7 includes mating "teeth" radially disposed therein. In use, the nut 5 may be oriented by removing it slightly from the recess so as to disengage the axially abutted teeth on the back surface of the nut 5 and the corresponding facing surface of the bottom of the recess 31. With the teeth disengaged, the nut 5 may be rotated as desired and then replaced in engagement with the "bottom" of the recess 31. An embodiment of a nut 5 hold down may then be installed to retain the nut axially in engagement with the corresponding orienting teeth in the recess 31. In one embodiment either (or both) of the outer circumferential surface and the inboard axial surface of the nut 5 is contoured with one or more indexed protrusions or indentions, such as for example hemi-spherical bumps or divots, and the corresponding adjacent surface(s) of the recess 31 is contoured with more or one (at least one of the mating surfaces of the recess 31 and the nut 5 requires a plurality of index profiles while the other then requires only one) inverse profiles that are inter-engageable with the bumps or divots Referring again to FIGS. 4A-4D, in one embodiment the recess 31 comprises three teeth 31a for inter-engagement with some of the teeth 5b. An indicator arrow 30 is provided between two of the teeth 5b to point to one of the numbers 5c to provide a reference point. When the axle nut 5 is inserted into the recess 31, the inter-engagement between teeth 31a and teeth 5b prevent the axle nut 5 from rotating in the recess when the shaft 13 is threaded into the axle nut 5. A clocking feature such as this provides the user with an ability to pre-calibrate the rotational position of the threads of the nut 5 and hence how much tension is applied by the lever 3 at a given rotational position at make up. In this way, a "set and forget" function is provided in which the same tension in the shaft 13 can be achieved at each re-installation of the axle assembly 2. Furthermore, both removal and re-installation of the axle assembly 2 can be accomplished one-handed with no need for adjustment of the axle nut 5.

FIGS. 4A-4D show features of the installation of the axle assembly 2 in the lower fork legs 1. In one embodiment, the user firstly inserts the axle nut 5 into the recess 31, noting which number 5c is indicated by the indicator arrow 30. Then the axle nut hold down 10 is fixed to the axle bracket 7 using the screw 9. It may be that these steps have already been completed (e.g. during manufacture) and therefore all the user need do is note the number 5c that is indicated. The user then threads the axle shaft 13 through the lever bracket 6, through a hub of a wheel (not shown), and up to the axle nut 5. The axle nut hold down 10 prevents accidental axial displacement of the axle nut 5 from the recess 31 when the end of the shaft 13 is brought into abutment with the axle nut 5. By fixing the axle nut 5 both axially and rotationally in the recess 31 the axle assembly 2 is operable one-handed and the user only has to be concerned with the lever end of the axle assembly 2. Furthermore when the user is replacing a wheel on a cross-country ride or race for example, the axle nut hold down 10 prevents loss of the axle nut 5 and/or loss of time looking for an axle nut 5 that has been knocked out of the bracket 7.

Optionally using one hand, the user begins threading the shaft 13 into the axle nut 5. In this embodiment the axle nut 5 has a depth and thread configuration such that only five or six turns of the lever 3 are necessary for the cam housing 4 to begin to come into contact with the lever bracket 6. Other configurations are possible where a greater or lesser number of revolutions would achieve the same effect. In this embodiment it is preferable that, after the five or six turns, the lever 3 finishes in a position such that upon closure the shortest distance between the fork leg and the lever 3 is between 1 mm and 20 mm (see FIG. 4D). This corresponds to an acceptable range of angles of the lever 3 in position B of 0° (within about 1 mm of fork leg) to 20° (within about 20 mm of fork leg). It will be noted that this range corresponds approximately with the angular difference between each fixed rotational position of the axle nut 5 defined by the teeth 5b. If the number of teeth 5b is increased or decreased, the acceptable range of angle of the lever 3 in position B should be increased or decreased by the same amount. In this way, the tension applied by the axle assembly 2 to the forks 1 is easily repeatable with each removal and replacement of the axle.

The user attempts to close the lever 3 using hand-force only. If some resistance is felt when the lever 3 is about 90° from the closed position and the lever 3 can be fully closed, then the correct amount of tension has been applied. If the user cannot fully close the lever 3, or it is too easy to close, the tension requires adjustment. This can be achieved using the axle nut 5. The axle nut hold down 10 is loosened and the shaft 13 unscrewed about four turns (i.e. not removed from the axle nut 5). The axle nut hold down is then rotated so that its flange 10a does not block axial movement of the axle nut 5. The lever end of the shaft 13 is pushed to disengage the teeth 5b of the axle nut from the teeth 31a of the recess 31. The axle nut 5 is then rotated clockwise or anti-clockwise to bring another number 5c to the position that is indicated by the indicator 30. The axle nut 5 is then re-inserted into the recess 31 and the remainder of the installation process repeated to check if the tension is correct.

In one embodiment the numbers 5c around the axle nut 5 are arranged so that selection of a higher number increases the tension and selection of a lower number decreases the tension. Thus the numbers 5c increase in an anti-clockwise direction around the axle nut 5, so that selection of a higher number moves the axle nut 5 axially further onto the shaft 13, and the selection of a lower number moves the axle nut 5 further off the axle nut 13. Alternatively, the reverse, or any other suitable sequence, may be used.

The process of removal of the axle assembly 2 is the reverse of installation, except that the axle nut 5 does not need to be adjusted. Furthermore when the axle assembly is re-inserted, tension is already set correctly and the axle nut 5 does not need adjustment. In other words, once the correct rotation of the nut 5, corresponding to proper make up of the axle and positioning of the lever 3, is determined, the system is calibrated and the process need not be repeated with successive wheel removal and re-installation. This is a significant advantage over prior quick releases that need tension adjustment every time.

When the shaft 13 is threaded into axle nut 5, to attach a wheel (not shown) to the fork 1, or unthreaded from axle nut 5 to remove a wheel (not shown) from the fork 1, it is desirable that the lever 3 not interfere with the fork leg 1. This is particularly important in view of the fact that, since the axle nut 5 is rotationally fixed in position and seated in the recess 31, it cannot be used to release the axle assembly 2 whilst holding the lever 3 still; thus the user is forced to rotate lever 3. In one embodiment, when the user opens and releases the lever 3 from the closed position (position 1 in FIG. 3A), the lever 3 cannot rotate around the cam shaft 12 axis any further than 153 degrees from that closed position. This is achieved by the aforementioned lever stops 11 provided on the lever 3. Thus the user can advantageously use a single finger to rotate the shaft 13 into or out of the axle nut 5 without having to ensure that the lever 3 does not get blocked in rotation around the axis of the shaft 13 by the fork leg 1.

As shown herein, some embodiments include an interaction between a portion of the lever 3 and a "flange" surface of the cam housing 4 when the lever 3 is moved to position 2. That interaction ensures that the lever 3 does not over-rotate, while being moved to position 2, to a position where it interferes with the fork leg 1. Because position 2 (or some position more toward position 2 than position 1) is the position in which the cam housing 4 has been moved away from interference with the lever axle bracket 6 at surface 20, position 2 (or there about) is also the position of the lever 3 when threading or unthreading of the shaft 13 and nut 5 occurs. The interaction of the lever 3 and the cam housing 4 as described and shown in various embodiments hereof is therefore appropriate as occurring in position 2.

It is noted that the cam housing 4 surface 20 and the lever axle bracket 6 surface 20 may be inter-engagably serrated for enhanced anti-rotation of the cam housing 4 relative to the lever axle bracket 6. When the shaft 13 is threaded into nut 5 to the proper tightness (as described above) the additional rotation of the lever 3 (from position A to position B) places the shaft 13, and the cam follower shaft 15 in tension and helps to engage surface serrations or "teeth", or other suitable friction inducing features such as ceramic grit or other, of the face of the cam housing 4 with the surface 20 of the lever axle bracket 6. Optionally or additionally, the surface 20 of the lever axle bracket 6 may include suitable or compatible friction inducing surface features. Such inter-engagement may be achieved using an indexed (e.g. inner diameter teeth) recess and corresponding indexed interface (e.g. teeth) on the cam housing 4.

Figure 6B:
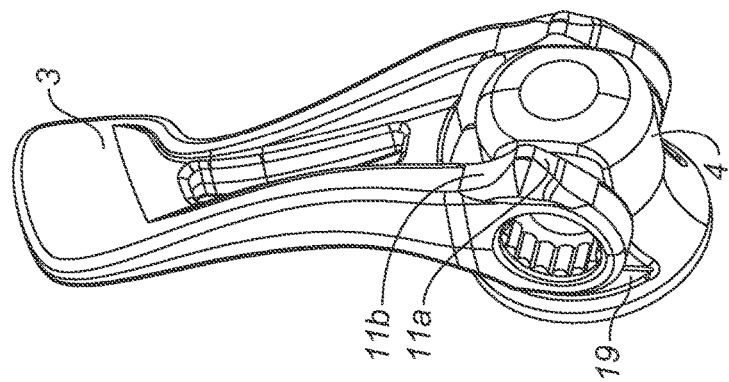
FIGS. 6A-6C show various views of a second embodiment of a lever part of an axle.
Figure 6C:
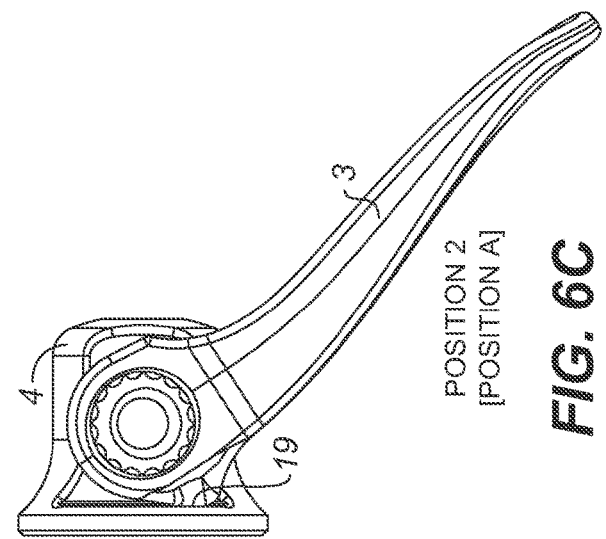
Figure 6A:
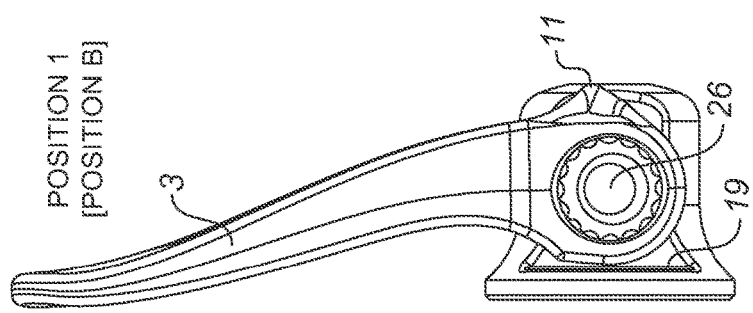
Figure 8B:
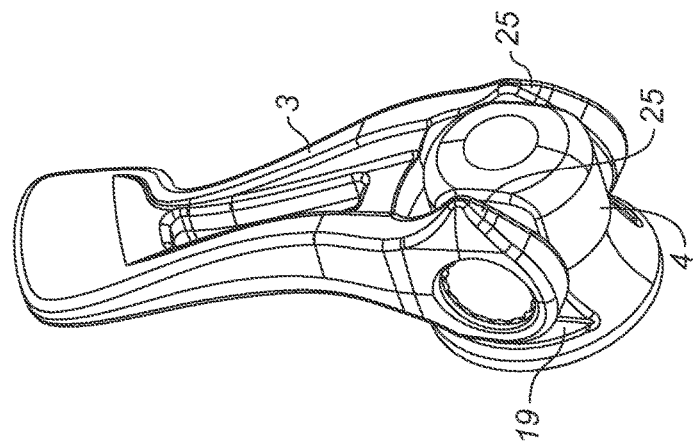
FIGS. 8A-8C show various views of a fourth embodiment of a lever part of an axle.
Figure 8C:
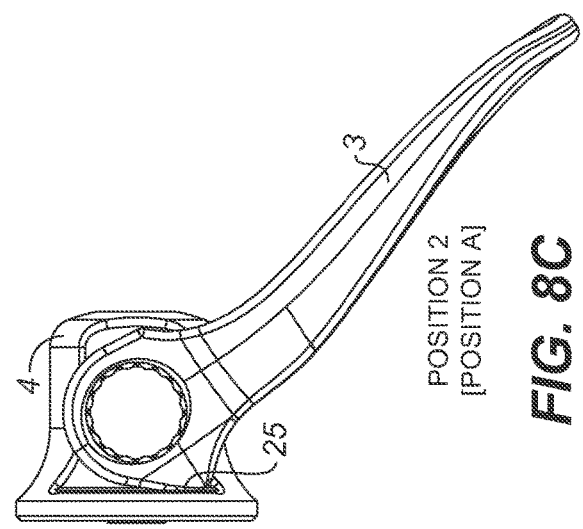
Figure 8A:
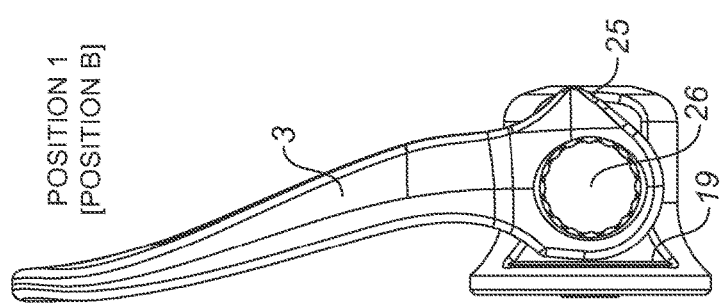

FIGS. 6A-6C, 7A-7C and 8A-8C show embodiments of the lever 3 and cam housing 4 relatively positioned. FIGS. 6A-6C show the lever 3 rotatable about axis 26 relative to the cam housing 4. When the lever 3 is rotated from position 1 to position 2 the rotation is stopped at position 2 by an interaction between lever stop 11 and surface 19 of the cam housing 4. That interaction ensures that the lever 3 will not interfere with the fork leg 1 during threading and unthreading of the shaft 13 with the axle nut 5. FIGS. 7A-7C show an alternative embodiment that provides a surface area 24 interaction between the lever 3 and the lever stop 23 thereby limiting rotation of the lever 3, about cam shaft axis 26, from position 1 to position 2. In the embodiment of FIGS. 7A and 7B, the lever stop 23 may be either fixed to the cam housing 4 or integral therewith. The surface area 24 corresponds to a portion, or local region, of the lever 3 where the radius of curvature becomes very large (e.g. approaching infinity, i.e. the surface may be substantially flat). FIGS. 8A-8C show the lever 3 rotatable about axis 26 relative to the cam housing 4. When the lever 3 is rotated from position 1 to position 2 the rotation is stopped at position 2 by an interaction between lever stop surface area 25 and surface 19 of the cam housing 4. In any embodiment described herein it is envisaged that there may be provided only one lever stop (on the lever 3, on the cam housing 4, or partly on both), instead of the two lever stops described.

In one embodiment, the lever axle bracket 6 includes an indexed ("female teeth") recess similar to that of the axle nut bracket 7 retaining the axle nut 5 and engaging the teeth thereon. As shown in FIGS. 10 and 11A-11D, the cam housing 4 includes "teeth" 28 (like those shown on the nut 5 in FIG. 5A) around a circumference of its flange at the diameter proximate the bearing surface 20. The shaft 13 and lever 3 are threaded (by rotation about the axis of shaft 13) into the nut 5 and stopped in the position range defined by dimension 21 and at a tension as described above. The about axis rotation of the shaft 13 is then adjusted in order to align the "teeth" 28 of the cam housing 4 with the gaps between teeth of the lever axle bracket 6. The lever 3 is then rotated from position A to position B thereby drawing the cam housing 4 into engagement 27 with the lever axle bracket 6 surface 20 and into clocked engagement 27 with the inwardly toothed recess of the lever axle bracket 6. In that manner the shaft 13 is prevented from rotating out of threaded engagement with nut 5 as long as lever 3 is maintained in position B (i.e. in engagement 27). It is noted that the "tooth" form used on any of the nut 5, the nut axle bracket 7, the lever axle bracket 6 and the cam housing 4 flange may be any tooth form suitable for use with rotational clocking and retention.

In one embodiment the tooth form nut 5 and cam housing 4 described herein may also be adapted for use on a standard quick release skewer in conjunction with tooth form "lawyer lips" on the drop out of a bicycle fork or other vehicle fork. One skewer arrangement is shown in FIGS. 4A-4D, and elsewhere in, U.S. Pat. No. 5,626,401 which patent is incorporated in its entirety herein by reference. Another skewer arrangement is shown in FIG. 1 of, and elsewhere in, U.S. Pat. No. 5,961,186 (the "'186 patent") which patent is incorporated in its entirety herein by reference. FIG. 1 of the '186 patent shows drop out lips 51 and nut 8 and flange 14.

While the foregoing is directed to embodiments of the present invention, other and further embodiments of the invention may be implemented without departing from the scope of the invention, and the scope thereof is determined by the claims that follow.

What is claimed is:

1. An axle assembly for a vehicle, said axle assembly comprising:
   an axle shaft having a bolt end and a lever end;
   a cam assembly coupled to said lever end of said axle shaft, said cam assembly comprising:
      a cam follower shaft located within said axle shaft, said cam follower shaft does not extend the full length of said axle shaft;
      a cam shaft coupled to said cam follower shaft; and
   a lever coupled to said cam assembly, said lever being rotatable from an open position to a closed position, an angle of maximum rotation for said lever between said open position and said closed position is less than 180 degrees.

2. The axle assembly of claim 1 wherein said cam follower shaft couples said cam assembly to said lever end of said axle shaft.

3. The axle assembly of claim 1 wherein said cam assembly further comprises:
   a cam housing, said cam housing coupled to said cam follower shaft.

4. The axle assembly of claim 1 wherein said cam shaft is at least partially disposed in a bore of said cam follower shaft to couple said cam shaft to said cam follower shaft.

5. The axle assembly of claim 1 wherein an end of said cam follower shaft encloses a non-cam portion of said cam shaft to couple said cam shaft to said cam follower shaft.

6. The axle assembly of claim 1 wherein said lever has arms which are connected to said cam shaft to couple said lever to said cam assembly.

7. The axle assembly of claim 1 wherein said lever forms a cone-shaped surface of rotation when said lever is rotated in said open position, and said cone-shaped surface of rotation does not intersect any part of said vehicle.

8. The axle assembly of claim 1 wherein said axle shaft further comprises:
   a hollow interior, said hollow interior comprised of a first region, a second region, and a third region.

9. The axle assembly of claim 8 wherein said first region extends 18 mm from said lever end towards said bolt end, said first region having an internal diameter of 11 mm.

10. The axle assembly of claim 8 wherein said second region begins 18 mm from said lever end and extends 16 mm towards said bolt end, said second region comprising threads with an internal diameter of 6 mm.

11. The axle assembly of claim 8 wherein said third region begins 34 mm from said lever end and extends 109 mm towards said bolt end, said third region having an internal diameter of 7.7 mm.

12. The axle assembly of claim 1 wherein said axle shaft further comprises:
   threads which extend at least partially along an outer surface of said axle shaft from said bolt end towards said lever end.

13. The axle assembly of claim 12 wherein said threads extend approximately 12 mm from said bolt end towards said lever end along said outer surface of said axle shaft.

14. The axle assembly of claim 1 wherein an outer surface of said axle shaft has no threads formed thereon at said lever end.

15. The axle assembly of claim 1 wherein said axle shaft further comprises:
   an opening extending from an outer surface of said axle shaft and penetrating through said axle shaft to said cam follower shaft, said opening configured to receive a pin for retaining said cam follower shaft in rotational position with respect to said axle shaft.

16. The axle assembly of claim 1 wherein said axle shaft further comprises:
   an opening extending from an outer surface of said axle shaft and penetrating through said axle shaft to said cam follower shaft, said opening configured to receive a pin for retaining said cam follower shaft in an axial position with respect to said axle shaft.

17. The axle assembly of claim 1 wherein said axle shaft is approximately 144 mm in length.

18. The axle assembly of claim 1 wherein said axle shaft has a maximum external diameter of approximately 15 mm.

19. The axle assembly of claim 1 wherein said cam follower shaft further comprises:
   a first end having external threads thereon, said external threads disposed for engaging with internal threads formed within said axle shaft; and
   a second end having a transverse bore formed therein, said transverse bore configured to receive said cam shaft.

20. The axle assembly of claim 10 wherein said cam follower shaft further comprises:
   an end having external threads thereon, said external threads of said cam follower shaft disposed for engaging with said threads of said second region of said hollow interior of said axle shaft.

21. An axle shaft comprising:
   a shaft body having a bolt end, and a lever end; and
   a hollow interior, said hollow interior comprised of a first region, a second region, and a third region, said second region having a threaded interior surface, said threaded interior surface configured for mating with an external thread of a cam follower shaft, wherein said second region has an inner diameter which is smaller than an inner diameter of said first region, and wherein said inner diameter of said second region is smaller than an inner diameter of said third region.

22. The axle shaft of claim 21 wherein said first region extends 18 mm from said lever end towards said bolt end, said first region having an internal diameter of 11 mm.

23. The axle shaft of claim 21 wherein said second region begins 18 mm from said lever end and extends 16 mm towards said bolt end, said threaded interior surface of said second region comprising threads with an internal diameter of 6 mm.

24. The axle shaft of claim 21 wherein said third region begins 34 mm from said lever end and extends 109 mm towards said bolt end, said third region having an internal diameter of 7.7 mm.

25. The axle shaft of claim 21 further comprising:
   threads which extend at least partially along an outer surface of said shaft body from said bolt end towards said lever end.

26. The axle shaft of claim 25 wherein said threads extend approximately 12 mm from said bolt end towards said lever end along said outer surface of said shaft body.

27. The axle shaft of claim 21 wherein an outer surface of said shaft body has no threads formed thereon at said lever end.

28. The axle shaft of claim 21 further comprising:
   an opening extending from an outer surface of said a shaft body penetrating through said shaft body to said second region, said opening configured to receive a pin for retaining said cam follower shaft in rotational position with respect to said axle shaft.

29. The axle shaft of claim 21 wherein said shaft body is 143.7 mm in length.

30. The axle shaft of claim 21 wherein said shaft body has a maximum external diameter of 14.9 mm.

31. An axle assembly for a vehicle, said axle assembly comprising:
   an axle shaft comprising:
      a shaft body having a bolt end, and a lever end; and
      a hollow interior, said hollow interior comprised of a first region, a second region, and a third region, said second region comprising internal threads;
   a cam assembly coupled to said lever end of said axle shaft, said cam assembly comprising:
      a cam housing;
      a cam follower shaft coupled to said cam housing, said cam follower shaft having a first end having external threads thereon, said cam follower shaft located within said hollow interior of said axle shaft, said external threads of said cam follower shaft disposed for engaging with said internal threads of said second region of said hollow interior of said axle shaft, said cam follower shaft does not extend the full length of said hollow interior of said axle shaft; and
      a cam shaft coupled to said cam follower shaft; and
   a lever coupled to said cam assembly, said lever being rotatable from an open position to a closed position, an angle of maximum rotation for said lever between said open position and said closed position is less than 180 degrees.

32. The axle assembly of claim 31 wherein said lever has a maximum angle of rotation, from said closed position to said open position of equal or less than 120 degrees.

33. The axle assembly of claim 31 wherein said lever has a maximum angle of rotation, from said closed position to said open position of equal or less than 165 degrees.

34. An axle assembly for a vehicle, said axle assembly comprising:
   an axle shaft comprising:
      a shaft body having a bolt end, and a lever end; and
      a hollow interior, said hollow interior comprised of a first region, a second region, and a third region, said second region comprising internal threads;
   a cam assembly coupled to said lever end of said axle shaft, said cam assembly comprising:
      a cam housing;
      a cam follower shaft coupled to said cam housing, said cam follower shaft having a first end having external threads thereon, said cam follower shaft located within said hollow interior of said axle shaft, said external threads of said cam follower shaft disposed for engaging with said internal threads of said second region of said hollow interior of said axle shaft, said cam follower shaft does not extend the full length of said hollow interior of said axle shaft; and
      a cam shaft coupled to said cam follower shaft; and
   a lever coupled to said cam assembly, said lever being rotatable from an open position to a closed position, wherein said lever, when in said open position, does not interfere with a component of said vehicle, wherein said second region has an inner diameter which is smaller than an inner diameter of said first region, and wherein said inner diameter of said second region is smaller than an inner diameter of said third region.

35. The axle assembly of claim 34 wherein said first region has an inner diameter which is larger than an inner diameter of said third region.

36. An axle assembly for a vehicle, said axle assembly comprising:
   an axle shaft having a bolt end and a lever end;
   a cam assembly coupled to said lever end of said axle shaft, said cam assembly comprising:
      a cam follower shaft located within said axle shaft, said cam follower shaft does not extend the full length of said axle shaft;
      a cam shaft coupled to said cam follower shaft; and
   a lever coupled to said cam assembly, said lever being rotatable from a fully open position to a closed position, wherein said lever, when rotated in said fully open position, does not interfere with a component of said vehicle, wherein said lever has a maximum angle of rotation, from said closed position to said fully open position, of between 120 and 165 degrees.

37. The axle assembly of claim 36 wherein said lever forms a cone-shaped surface of rotation when said lever is rotated in said fully open position.

* * * * *